US011640108B1

United States Patent
O'Connor

(10) Patent No.: US 11,640,108 B1
(45) Date of Patent: May 2, 2023

(54) SEALED SPEAKER AND SPEAKER BACK VOLUME WITHOUT WIRES

(71) Applicant: AMAZON TECHNOLOGIES, INC., Seattle, WA (US)

(72) Inventor: Michael O'Connor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 472 days.

(21) Appl. No.: 16/841,361

(22) Filed: Apr. 6, 2020

(51) Int. Cl.
G03B 29/00 (2021.01)
G03B 17/02 (2021.01)
H04R 1/02 (2006.01)
H04R 1/04 (2006.01)

(52) U.S. Cl.
CPC ............ *G03B 29/00* (2013.01); *G03B 17/02* (2013.01); *H04R 1/028* (2013.01); *H04R 1/04* (2013.01)

(58) Field of Classification Search
CPC .... H04R 1/02; H04R 1/021; H04R 1/025–06; H04R 1/22; H04R 1/28; H04R 1/2803; H04R 1/2811; H04R 1/2819; H04R 1/2869; H04R 1/2873; H04R 1/2884
See application file for complete search history.

(56) References Cited

U.S. PATENT DOCUMENTS 6,321,070 B1 *  11/2001  Clark ................... H04R 1/2811
                                                          455/350
7,193,644 B2    3/2007   Carter
8,139,098 B2    3/2012   Carter
8,144,183 B2    3/2012   Carter
8,154,581 B2    4/2012   Carter
8,780,201 B1    7/2014   Scalisi et al.
8,823,795 B1    9/2014   Scalisi et al.
8,842,180 B1    9/2014   Kasmir et al.
8,872,915 B1    10/2014  Scalisi et al.
8,937,659 B1    1/2015   Scalisi et al.
(Continued)

FOREIGN PATENT DOCUMENTS

FR          2911745 A1 *  7/2008  ............. H04M 1/03

OTHER PUBLICATIONS

English machine translation of FR 2911745 A1 (Bourgoin Gilles; Amplified Listening Device for Wireless Communication Device, Has Bonding Pad in Contact With Part of Internal End of Connecting Plate, and Electronic Board Connected to Part of External End of Connecting Plate; published Jul. 2008) (Year: 2008).*

*Primary Examiner* — Mark Fischer
(74) *Attorney, Agent, or Firm* — Lee & Hayes, P.C.

(57) ABSTRACT

Systems and methods electrically connect a sealed speaker and speaker back volume without wires. An electronic device includes a speaker with a first and second speaker contacts, a speaker box coupled with the speaker, and a printed circuit board (PCB) having a first and second contact pads. A speaker gasket is positioned between the speaker and the speaker box to form a seal. First and second spring strips electrically connect the first and second contact pads to the first and second speaker contacts, respectively, and each has a flat, thin cross-section in at least a portion extending between the speaker gasket and the speaker box. The first and second spring strips do not adversely affect the seal, do not require glue or sealer, and electrically connect with the first and second contact pads as the enclosure of the electronic device is closed.

18 Claims, 14 Drawing Sheets

(56) References Cited

U.S. PATENT DOCUMENTS

| | | |
|---|---|---|
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2012/0071215 A1* | 3/2012 | Bourque .............. H02J 7/00 455/573 |
| 2012/0195456 A1* | 8/2012 | Hiwatashi ........... H04R 1/025 381/386 |

\* cited by examiner

Cross-section through plane A-A of Figure 7

Cross-section through plane B-B of Figure 2

Cross-section through plane C-C of Figure 18

Cross-section through plane D-D of Figure 2

US 11,640,108 B1

SEALED SPEAKER AND SPEAKER BACK VOLUME WITHOUT WIRES

BACKGROUND AND SUMMARY

An electronic device often has an enclosure formed of two connecting parts, where each part contains a sub-assembly that has one or more electronic components of the electronic device. Accordingly, an electrical connection between the two sub-assemblies is required, and is made by one or both of wires and connectors. Where the electronic device is small, connectors take up valuable space within the device, are therefore undesirable, and are difficult to align when the two connecting parts of the enclosure and sub-assemblies are joined together. Where wire is used to electrically connect the two sub-assemblies, sufficient wire must be used to allow the electrical connection to be made in an independent step prior to joining the two connecting parts of the enclosure, and the wire must be carefully tucked into the enclosure when the two connecting parts are joined together.

Where the electronic device includes a compact speaker that requires a sealed back volume for a desired performance, when wires are used to make the electrical connection to a back side of the speaker (e.g., where the speaker is in one sub-assembly and the driving electronics are in the other sub-assembly), additional steps are required to seal the back volume with glue where the wires enter to ensure the desired performance. Thus, assembly of the electronic device becomes more complicated, more expensive, and less reliable.

One aspect of the present embodiments includes the realization that speaker wires that have a round cross-section make it difficult to seal a speaker box without the use of a glue or similar liquid sealing compound. The present embodiments solve this problem by using a flat, thin, spring strip to electrically connect between speaker contacts within the speaker box and contact pads of a printed circuit board (PCB) that is outside the speaker box. Advantageously, the flat, thin, spring strips pass between the speaker box and a speaker gasket without adversely affecting the seal made by the speaker gasket and the speaker box housing, and thereby avoiding the need to use glue or another sealing compound.

Another aspect of the present embodiments includes the realization that the use of wires to connect between a speaker and a printed circuit board in an electronic device requires that the wires be manually connected, using either an installed connector or by soldering directly to the PCB, which increases assembly time and thereby cost of the electronic device. The present embodiments solve this problem by using flat, thin, spring strips to electrically connect between speaker contacts within the speaker box and contact pads of a printed circuit board (PCB) that is outside the speaker box. The spring strips have a PCB contact that connects with corresponding contact pads on the PCB and speaker contact areas that connect with speaker contacts. Advantageously, the use of spring strips alleviates the need to manually make connections between the speaker and the PCB in an independent step during assembly, thereby reducing the assembly time and cost of the electronic device. Instead, the configuration of the spring strips, the PCB, and the speaker cause the connection between the PCB and the speaker to be made automatically as two parts of an enclosure of the electronic device are assembled (closed).

DETAILED DESCRIPTION OF THE EMBODIMENTS

Figure 1:
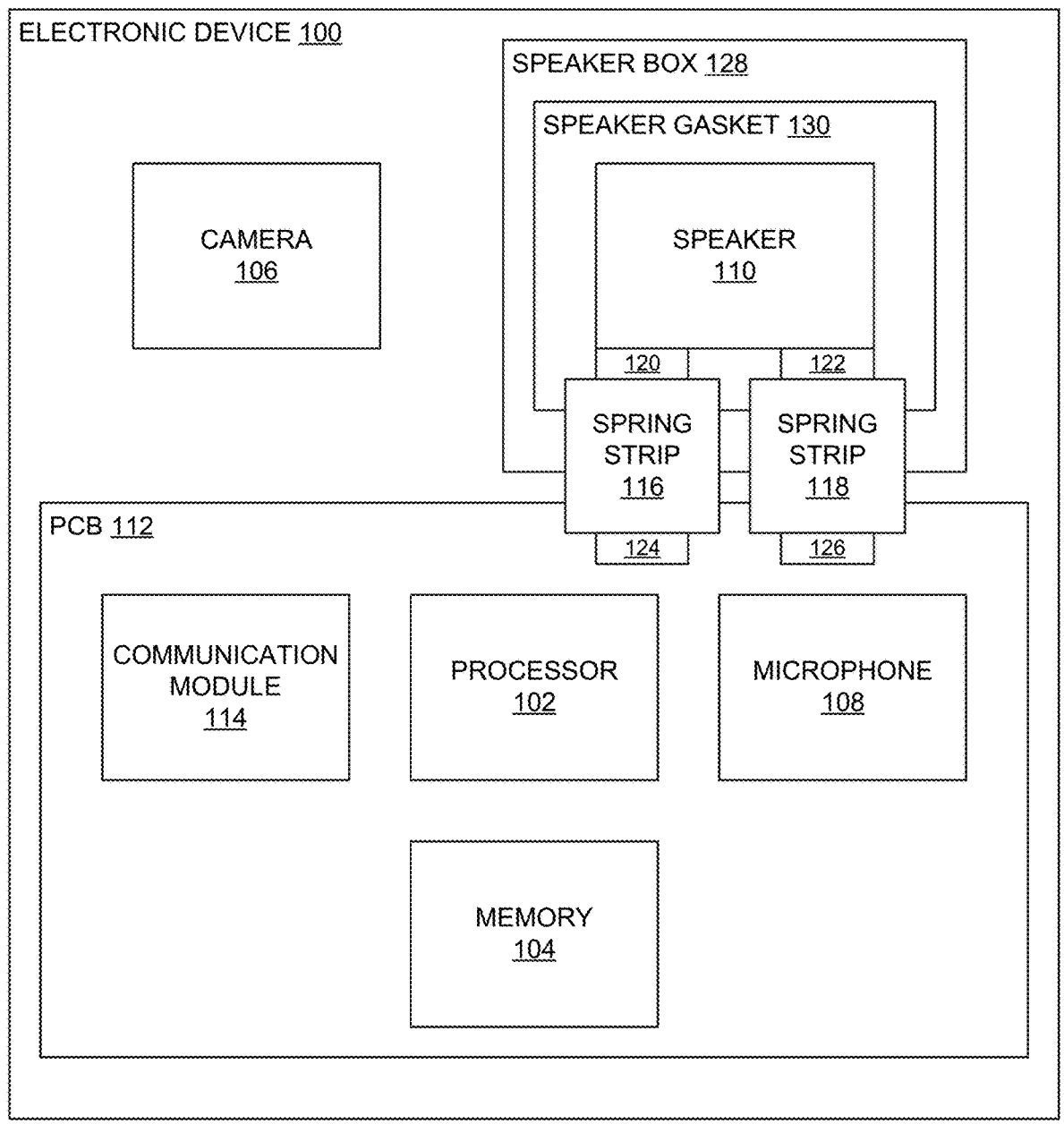
FIG. 1 is a functional block diagram illustrating an example electronic device that includes a processor, memory, a camera, a microphone, a speaker, a printed circuit board (PCB), a communication module, and first and second spring strips that electrically connect the speaker to the PCB, in an embodiment.

FIG. 1 is a functional block diagram showing one example electronic device 100 that includes a processor 102, memory 104, a camera 106, a microphone 108, a speaker 110, a printed circuit board (PCB) 112, a communication module 114, and first and second spring strips 116/118 that electrically connect the speaker 110 to the PCB 112. The speaker 110 has a first speaker contact 120 and a second speaker contact 122 for receiving an electrical drive signal. The PCB 112 includes a first contact pad 124 and a second contact pad 126 that cooperate to provide an electrical drive signal for the speaker 110. The communication module 114 implements one or more wireless and/or wired communication protocols (e.g., Wi-Fi) and allows the electronic device 100 to communicate with one or more remote devices (not shown) via a network. A speaker box 128 couples with the speaker 110 and a speaker gasket 130 is positioned between the speaker 110 and the speaker box 128 to form a seal.

The first spring strip 116 electrically connects the first contact pad 124 to the first speaker contact 120, located within the speaker box 128, without affecting the seal formed by the speaker gasket 130. Similarly, the second spring strip 118 electrically connects the second contact pad 126 to the second speaker contact 122, located within the speaker box 128, without affecting the seal formed by the speaker gasket 130. Thus, the first spring strip 116 and the second spring strip 118 are sized and shaped such that the seal formed by the junction of the speaker gasket 130 with the speaker box 128 is maintained even though the first spring strip 116 and the second spring strip 118 are located between the speaker gasket 130 and the speaker box 128.

Advantageously, in at least some embodiments, and as further described below, the first spring strip 116 and the second spring strip 118 cause the electrical connections between the speaker 110 and the at least one PCB 112 to occur automatically, via the first contact pad 124, the second contact pad 126, the first spring strip 116, and the second spring strip 118, when the electronic device 100 is being manufactured, without manual connection of a connector between the speaker 110 and the PCB 112.

Figure 2:
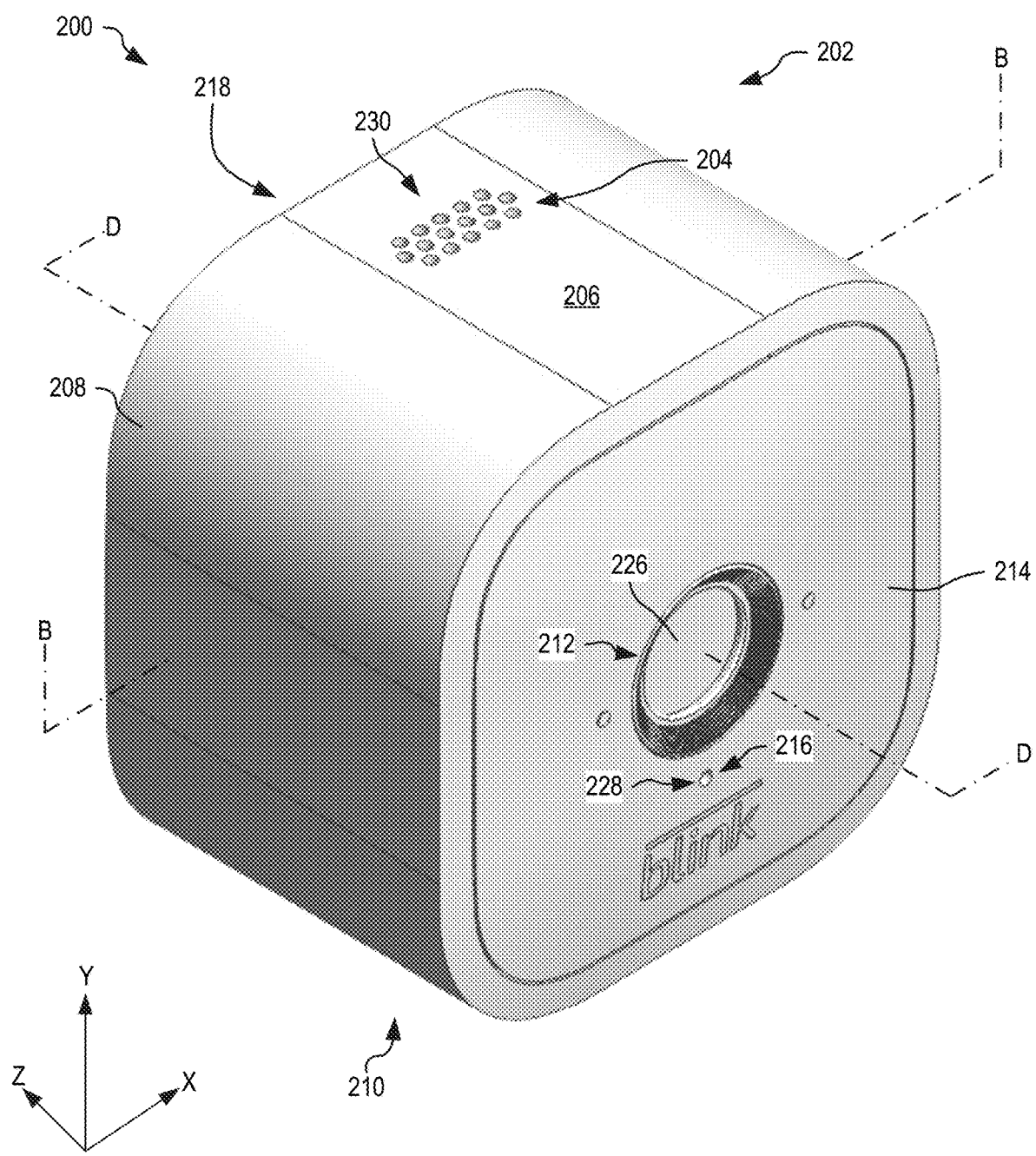
FIG. 2 is a perspective view of the electronic device of FIG. 1 illustrating an enclosure housing the camera, the microphone, and the speaker, in an embodiment.

FIG. 2 is a perspective view of an electronic device 200, which is an example of the electronic device 100 of FIG. 1, illustrating an enclosure 202 that houses a camera 226, a microphone 228, and a speaker 230. The camera 226, the microphone 228, and the speaker 230 are embodiments of, and the features thereof discussed below apply to, the camera 106, the microphone 108, and the speaker 110 of FIG. 1, respectively. A lens of the camera 230 is visible in FIG. 2, but the camera 230 may have more components, including an image sensor, an image processor, and connecting circuitry, that are collectively referred to as the camera 230. The speaker 230 is positioned behind one or more speaker holes 204 in one side 206 of an outer wall 208 of an outer housing 210 portion of the enclosure 202. The camera 226 is positioned within the enclosure 202 to have a field-of-view through a camera aperture 212 in a front face 214 of the enclosure 202, and the microphone 228 is positioned behind a microphone aperture 216 in the front face 214. A rear face 218 is positioned opposite the front face 214 and is part of an inner housing (see inner housing 302 of FIG. 3) that couples with the outer housing 210 to form the enclosure 202.

The electronic device 200 is shown as an audio/video recording and communication device that allows a remote party (e.g., a user/owner of the electronic device 200) to view, hear, and audibly converse with an object (e.g., a person) positioned in front of the electronic device 200. For example, the microphone 228 captures audio near the electronic device 200, and the audio may be relayed (e.g., wirelessly) to the remote party (e.g., via a mobile phone or other electronic device used by the remote party), the speaker 230 outputs audio generated by the remote party as sound, and the camera 226 captures images of the object in front of the electronic device 200.

Figure 3:
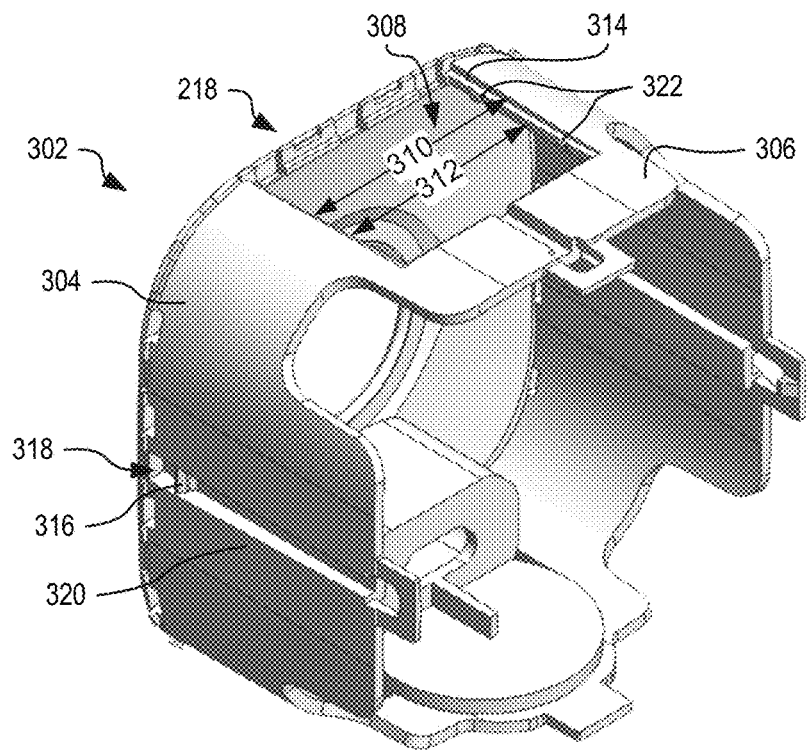
FIG. 3 is a perspective view of an inner housing that forms a rear part of the enclosure of FIG. 2, in an embodiment.
Figure 4:
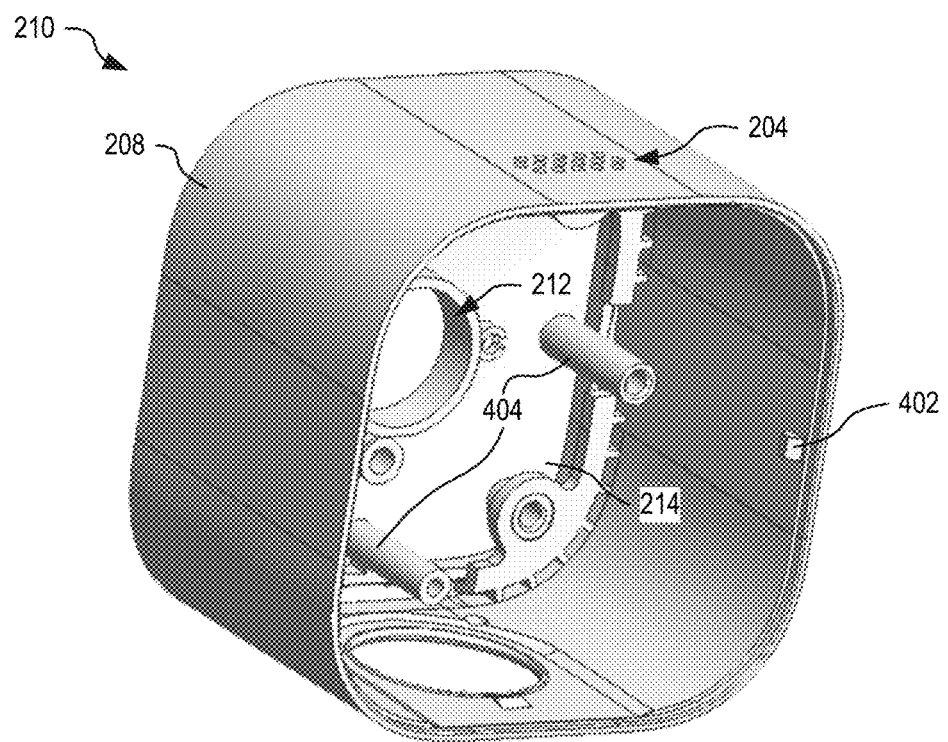
FIG. 4 is a perspective view of the outer housing of FIG. 2 prior to assembly of the electronic device, in an embodiment.
Figure 5:
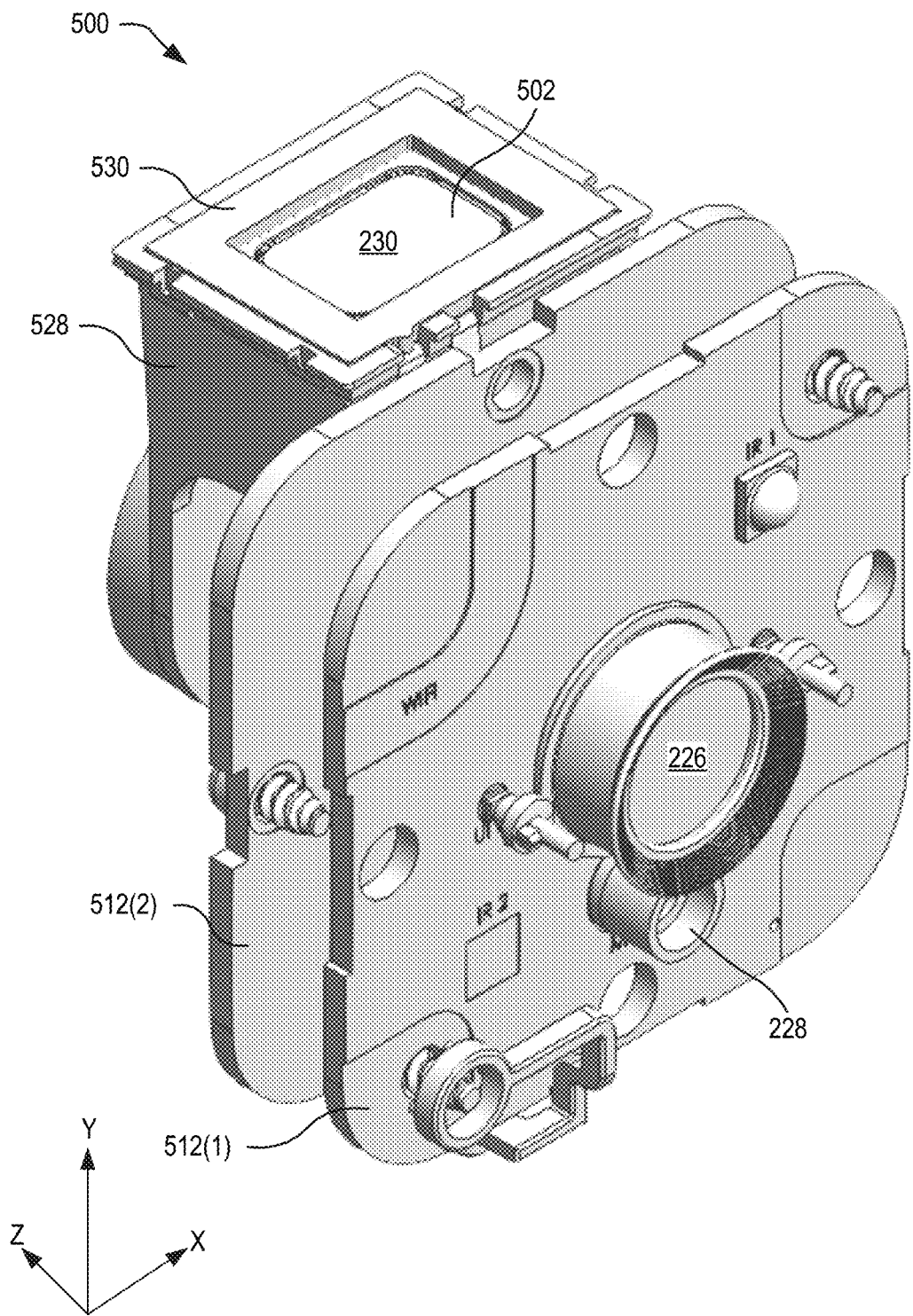
FIG. 5 is a perspective view showing example internal components of the electronic device of FIGS. 1 and 2, in embodiments.

FIG. 3 is a perspective view of the inner housing 302 that forms a rear part of the enclosure 202 of FIG. 2. FIG. 4 is a perspective view of the outer housing 210 of FIG. 2 prior to assembly of the electronic device 200. FIG. 5 is a perspective view showing example internal components 500 of the electronic device 200 of FIGS. 1 and 2. FIGS. 3, 4 and 5 are best viewed together with the following description.

The inner housing 302 has an inner wall 304 extending at least partially from (and/or around) the rear face 218. One side 306 (e.g., a top portion) of the inner wall 304 forms a stepped aperture 308 that aligns with the position of the speaker holes 204 in the outer wall 208 when the inner housing 302 is coupled with the outer housing 210. The stepped aperture 308 has an external dimension 310 that is greater than an internal dimension 312, thereby forming a lip 314 within the stepped aperture 308. The inner wall 304 may include at least a first inner-housing protrusion 316 positioned within a channel 318 on a first side 320 of the inner housing 302, for example. In certain embodiments, the inner wall 304 includes two inner-housing protrusions 316, where a second inner-housing protrusion (not shown) is in a second channel (not shown) on a second side (e.g., opposite the first side 320 where the first inner-housing protrusion 316 is located) of the inner housing 302. In certain embodiments, the channel 318 is omitted. However, more or fewer channels 318 and/or protrusions 316 may be included with the inner wall 304 without departing from the scope of the embodiments herein. The inner-housing protrusions 316 mechanically engage corresponding outer-housing protrusions 402 of the outer wall 208 of the outer housing 210 such that the inner housing 302 snaps into the outer housing 210 and is retained by the mechanical engagement of the inner-housing protrusions 316 with the corresponding outer-housing protrusions 402.

With reference to FIG. 5, the internal components 500 include the camera 226, the microphone 228, the speaker 230, a first PCB 512(1), a second PCB 512(2), the speaker box 528, and the speaker gasket 530. The first PCB 512(1) and the second PCB 512(2) are embodiments of, and the features thereof discussed below apply to, the PCB 112 of FIG. 1. The speaker box 528 and the speaker gasket 530 are embodiments of, and the features thereof discussed below apply to, the speaker box 128 and the speaker gasket 130 of FIG. 1, respectively. The internal components 500 may include more or fewer PCBs 512 without departing from the scope of the embodiments herein. The PCBs 512 include electronic circuitry for operating the electronic device 200, such as a processor, memory (e.g., the processor 102 and the memory 104), the camera 226, the microphone 228, the speaker 230, and other components of the electronic device 200 (for example the communication module 114 of FIG. 1). Two or more PCBs 512, when included, may electrically connect via one or more sockets and plugs that connect when the PCBs 512 are coupled with the front face 214.

The outer wall 208 of the outer housing 210 extends at least partially around the front face 214 and forms the speaker holes 204 at the side 206 (e.g., the top side). The front face 214 includes at least one pillar 404 on an internal surface that mechanically couples with the at least one PCB 512, which is positioned parallel to a plane of the front face 214.

For the speaker 230 to generate a sound output with a desired frequency response, the speaker box 528 is preferably sealed and contains a suitable volume of air to achieve the desired frequency response. Accordingly, the speaker gasket 530 is positioned around the speaker 230 to form the seal between the speaker 230 and the speaker box 528 around a speaker opening 1206 (FIG. 12) in the speaker box 528. The seal between the speaker 230 and the speaker box 528 around the speaker opening 1206 is preferably airtight under expected operating conditions for the electronic device 200. For example, the speaker gasket 530 preferably maintains the airtight seal as the volume of air inside the speaker box is compressed and expanded when the speaker diaphragm 502 deflects during normal operation.

As shown in FIG. 5, the speaker 230 lies in the X-Z plane, whereas the at least one PCB 512 lies in the X-Y plane. Accordingly, an electrical connection between the speaker 230 and the at least one PCB 512 requires a transition between these planes. It should be appreciated that, although the at least one PCB 512 and the speaker 230 are shown orthogonal to each other, they may be at other angles to each other without departing from the scope hereof.

Figure 6:
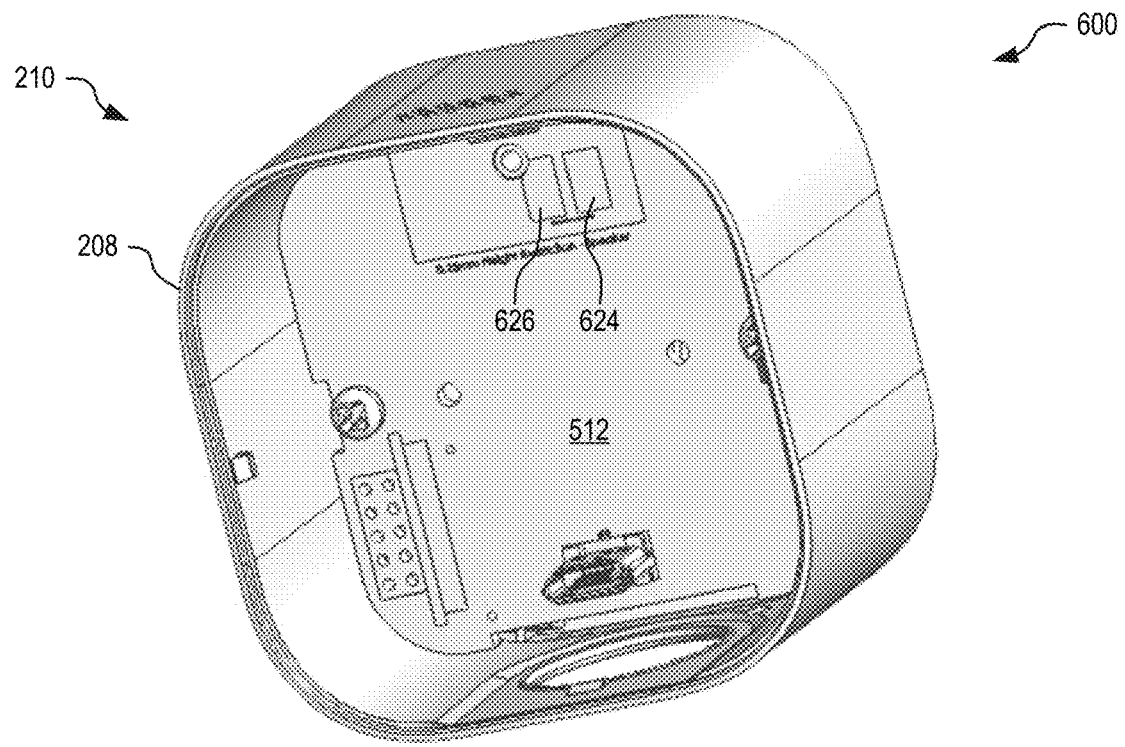
FIG. 6 is a perspective view showing the PCB(s) installed within the outer housing at one stage in the assembly of the electronic device, in an embodiment.

FIG. 6 is a perspective view showing a first sub-assembly 600 of the electronic device 200 that includes the at least one PCB 512 installed within the outer housing 210. For example, the at least one PCB 512 is installed onto the pillars 404 and may be secured (e.g., removably retained) by at least one screw or other fastening mechanism(s). The at least one PCB 512 includes a first contact pad 624 and a second contact pad 626 that cooperate to provide an electrical drive signal for the speaker 230. The first contact pad 624 and the second contact pad 626 are embodiments of, and the features thereof discussed below apply to, the first contact pad 124 and the second contact pad 126 of FIG. 1, respectively. For example, the first contact pad 624 and the second contact pad 626 may connect electrically to an amplifier and/or other speaker drive circuitry on the at least one PCB 512.

Figure 7:
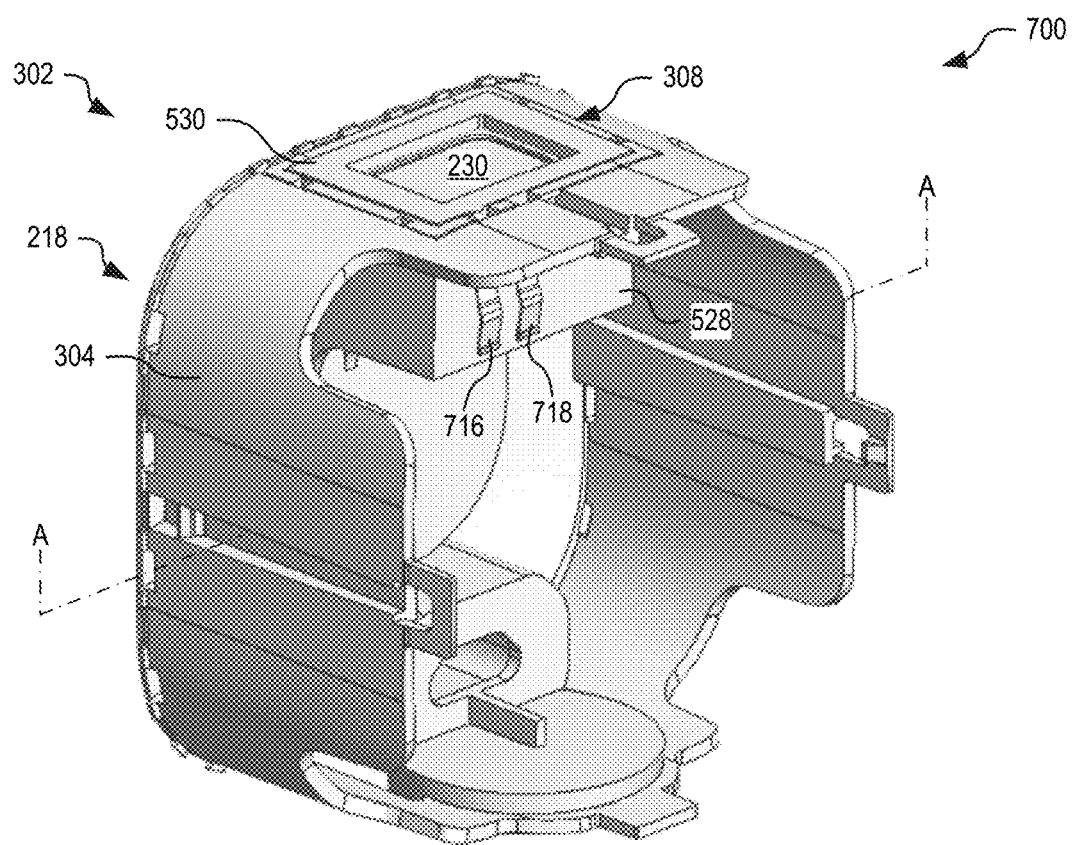
FIG. 7 is a perspective view showing the inner housing assembled with the speaker box, the speaker, the speaker gasket, and the first and second spring strips, in an embodiment.

FIG. 7 is a perspective view showing a second sub-assembly 700 of the electronic device 200 that includes the inner housing 302 of FIG. 3 assembled with the speaker box 528 of FIG. 5, the speaker 230, the speaker gasket 530, a first spring strip 716, and the second spring strip 718. The first spring strip 716 and the second spring strip 718 are embodiments of, and the features thereof discussed below apply to, the first spring strip 116 and the second spring strip 118 of FIG. 1, respectively. The speaker box 528 is mechanically retained (described in detail below) within the stepped aperture 308 of the inner housing 302. Accordingly, the speaker 230 does not electrically couple with the PCB 512 until the first sub-assembly 600 and second sub-assembly 700 are joined (e.g., the inner housing 302 is slid into the outer housing 210 past a given threshold).

As discussed in further detail below, the first spring strip 716 and the second spring strip 718 preferably comprise materials that are flexible, resilient, and electrically conductive. Preferably, the material of the spring strips 716/718 has electrical resistivity in the range from 5.2e-8 ohm-meters to 7.4e-7 ohm-meters. For example, the spring strips 716/718 may comprise metals, such as steel, copper, and copper alloys (e.g., beryllium copper). The spring strips 716/718 may comprise a base metal with a plating layer to enhance electrical conductivity. Example plating materials include zinc, copper, and gold. In some embodiments, each of the first spring strip 716 and the second spring strip 718 may be made of a full hard-temper type-301 stainless steel with a thickness in the range of between 0.3 mm and 0.05 mm (e.g., a thickness of one-tenth of one millimeter 0.1 mm for the full hard-temper type-301 stainless steel) and a resistivity of 7.4e−7 at room temperature, and may be zinc-plated to improve electrical conductivity. The first spring strip 716 and the second spring strip 718 may be made using a progressive die, stamping process. However, other materials, thicknesses, and manufacturing processes may be used without departing from the scope of the embodiments hereof, so long as a sufficient seal is made between the speaker box 528, the first spring strip 716, the second spring strip 718, and the speaker 230.

Conventionally, electrical connections between two sub-assemblies, such as the first sub-assembly 600 and the second sub-assembly 700, requires the use of at least two wires and/or an electrical connector that is manually connected, for example by soldering and/or plugging in, when the two sub-assemblies are joined together. However, when using wires, a sufficient length of wire is required to allow the necessary connections to be made while the sub-assembles are separated, a sealing compound (e.g., glue) must be added where the wires pass between the speaker gasket and the speaker box (e.g., since the round cross-section of the wire prevents the gasket from sealing), and the excess of wire must be carefully tucked into the internal volume of the enclosure to prevent the wire from obstructing the internal parts and from preventing the two sub-assemblies from joining correctly. Accordingly, the use of wire decreases reliability (e.g., the wire reduces the probability of correct assembly) and increases cost of the electronic product, since connecting and handling of the wires requires time.

Advantageously, the first spring strip 716 and the second spring strip 718 cause the electrical connections between the speaker 230 and the at least one PCB 512 to occur automatically, via the first contact pad 624, the second contact pad 626, the first spring strip 716, and the second spring strip 718, when the first sub-assembly 600 and the second sub-assembly 700 are joined. For example, at or near a final assembly stage of the electronic device 200, the inner housing 302 slides into the outer housing 210 to form the enclosure 202 and to electrically connect the speaker 230 with the at least one PCB 512 via the first spring strip 716 and the second spring strip 718.

Figure 8:
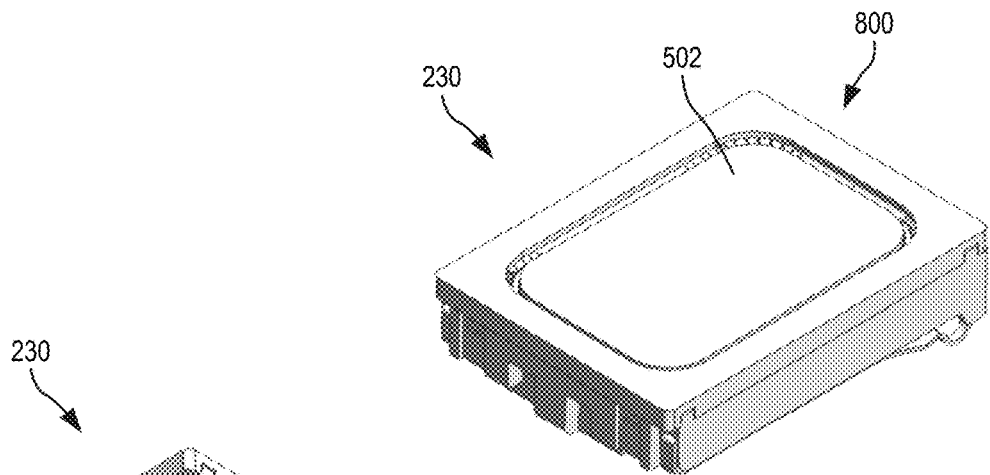
FIGS. 8 and 9 are top and bottom perspective views, respectively, of the speaker of FIGS. 1, 2, 5 and 6, in an embodiment.
Figure 9:
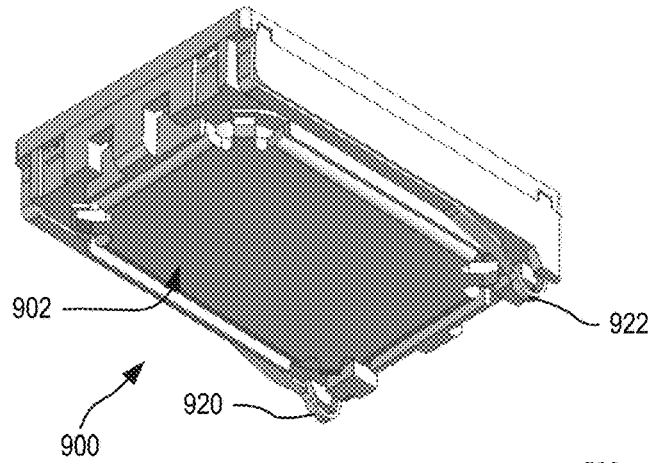

FIGS. 8 and 9 are top and bottom perspective views, respectively, of the speaker 230 of FIGS. 2, 5, and 6, which is an embodiment of the speaker 110 of FIG. 1. The speaker 230 is a generally flat, packaged component that is controlled to emit sound, and that is convenient for use in a small electronic device. In one embodiment, the speaker 230 is an OWS-111535LA-8 from OLE WOLFF, has overall dimensions of 11 mm×15 mm×3.5 mm, and accepts an input power of one watt. A top side 800 (outward facing relative to the speaker box 528) of the speaker 230 has the speaker diaphragm 502 that is positioned beneath the speaker holes 204 when the electronic device 200 is assembled. A bottom side 900 of the speaker 230 has a first speaker contact 920 and a second speaker contact 922 for receiving an electrical drive signal. The first speaker contact 920 and the second speaker contact 922 are embodiments of, and the features thereof discussed below apply to, the first speaker contact 120 and the second speaker contact 122 of FIG. 1, respectively. A bottom surface 902 of the speaker 230 may be electrically conductive (e.g., made of metal). Accordingly, as described below, contact with the bottom surface 902 is avoided when connecting to the first and second speaker contacts 920/922 to avoid shorting out the speaker 230. The first and second speaker contacts 920/922 are spring contacts that exert a force in a direction perpendicular to the bottom surface 902 of the speaker 230. Thus, for the speaker contacts 920/922 to directly contact the PCB 512, the speaker would typically need to be positioned parallel to, and close to, the PCB 512. However, such requirements limit the design of the electronic device. The present embodiments solve this problem at least by providing the first and second spring strips 716/718, which include contact areas at either end, where the contact areas lie in substantially orthogonal planes. The geometry of the first and second spring strips 716/718 is described in further detail below.

Figure 10:
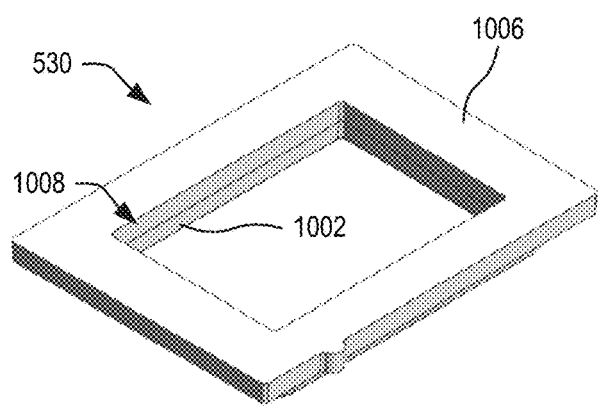
FIGS. 10 and 11 are top and bottom perspective views, respectively, of the speaker gasket of FIGS. 5 and 6, in an embodiment.
Figure 11:
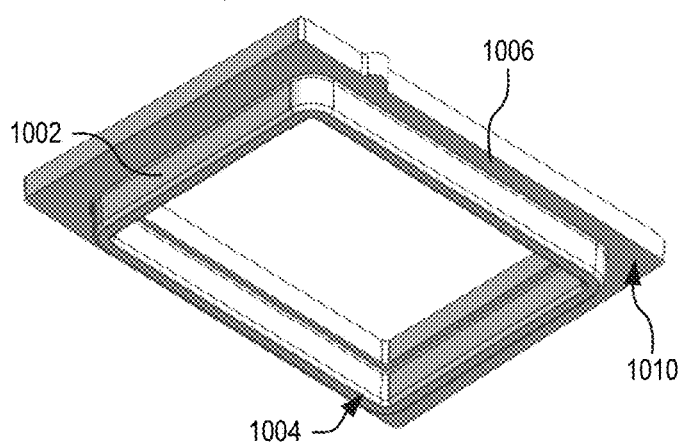

FIGS. 10 and 11 are top and bottom perspective views, respectively, of the speaker gasket 530 of FIGS. 5 and 6, which is an embodiment of the speaker gasket 130 of FIG. 1. In one embodiment, the speaker gasket 530 is made of a silicone rubber of between 40 A and 70 A durometer. The speaker gasket 530 is formed with a gasket wall 1002 that has an internal aperture 1004 for surrounding side edges of the speaker 230, and a gasket flange 1006 forming an aperture 1008 smaller than the internal aperture 1004 of the gasket wall 1002. When the electronic device 200 is assembled, the gasket flange 1006 is positioned between the speaker 230 and an internal surface (see internal surface 2002 of FIG. 20) of the outer wall 208 of the outer housing 210, where a thickness of the gasket flange 1006 is selected such that the outer wall 208 and the speaker 230 compress the gasket flange 1006 to form the seal between the speaker 230 and the speaker box 528, and thereby to also retain the speaker 230 within the speaker box 528. The gasket flange 1006 is also compressed between the internal surface of the outer wall 208 and the speaker box 528 to form the seal between the speaker 230 and the speaker box 528. As described below, the first spring strip 716 and the second spring strip 718 each have a flat, thin (e.g., a thickness in the range of between 0.3 mm and 0.05 mm) cross-section that extends between the speaker gasket 530 and the speaker box 528. Advantageously, this flat, thin cross-section does not adversely affect the seal formed by the speaker gasket 530, and no additional sealing compound (e.g., glue) is required in the area where the first spring strip 716 and the second spring strip 718 pass between the speaker gasket 530 and the speaker box 528.

Figure 12:
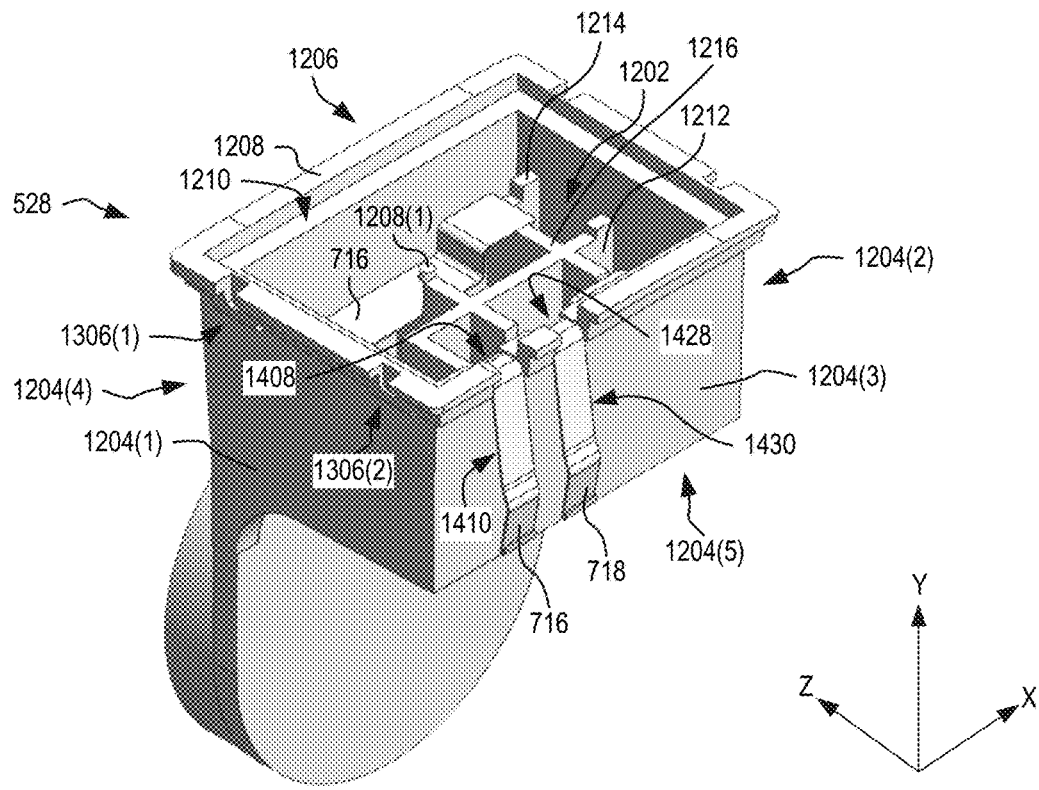
FIG. 12 is a top perspective view showing example internal structure of the speaker box of FIGS. 5 and 7 with the first and second spring strips, in an embodiment.
Figure 13:
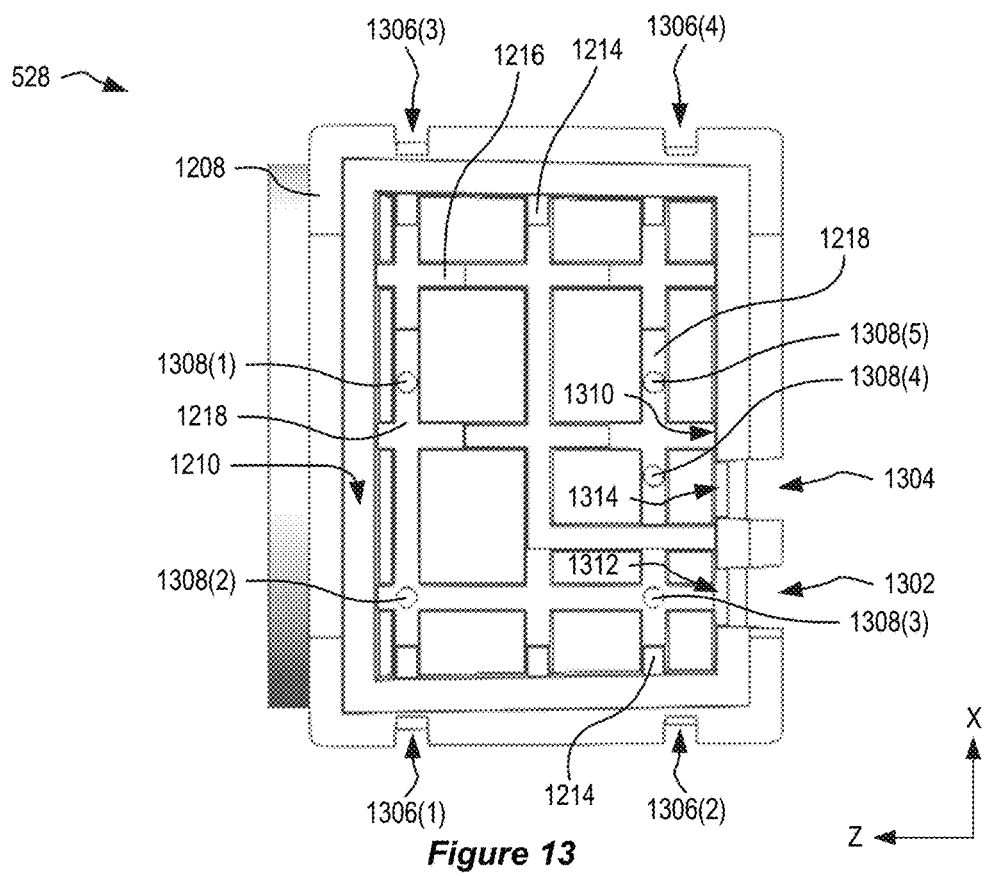
FIG. 13 is a top view of the speaker box with the first and second spring strips omitted, in an embodiment.
Figure 14:
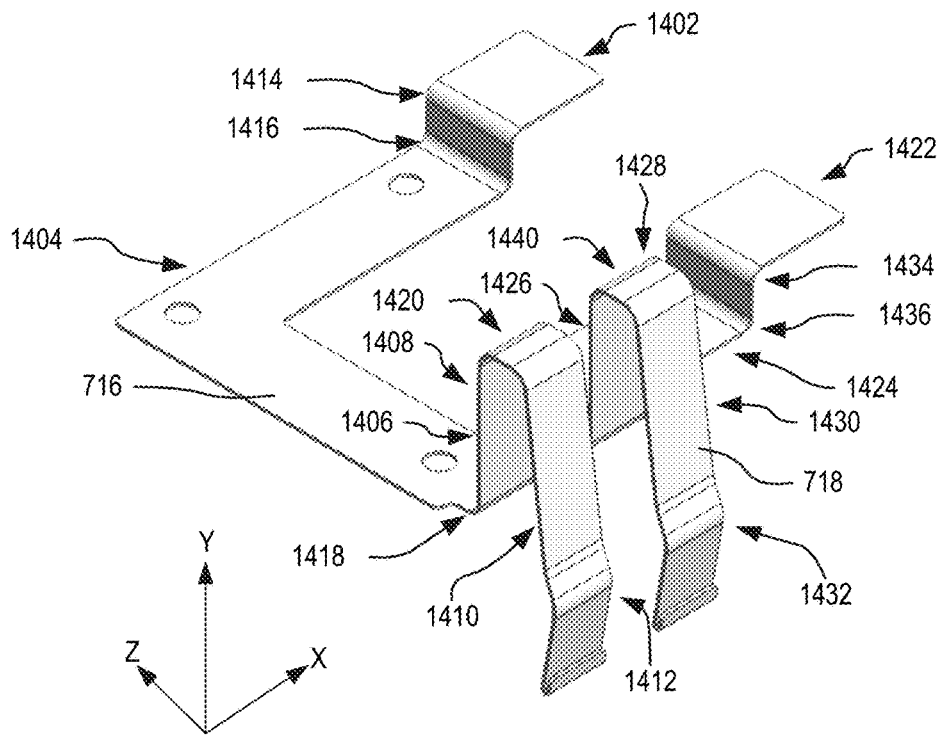
FIG. 14 is a top perspective view of the first and second spring strips of FIGS. 7 and 12, in an embodiment.
Figure 15:
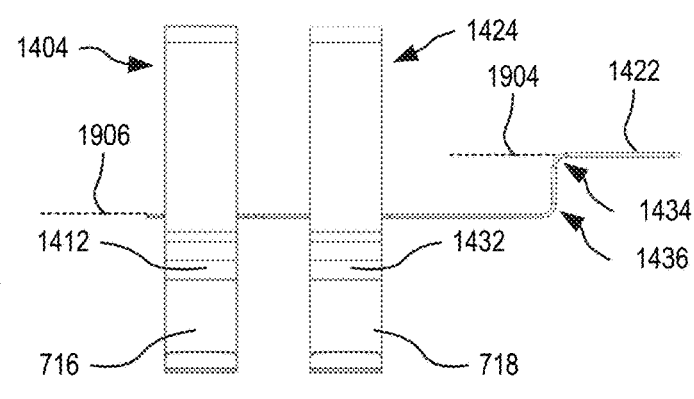
FIG. 15 is a front elevation of the first and second spring strips of FIGS. 7, 12 and 14, in an embodiment.
Figure 16:
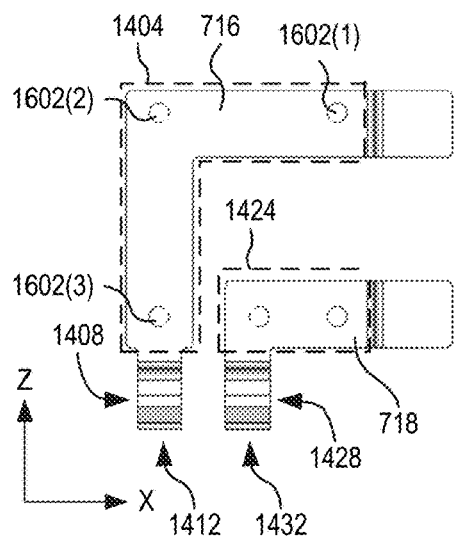
FIG. 16 is a plan view of the first and second spring strips of FIGS. 7, 12, 14 and 15, in an embodiment.
Figure 17:
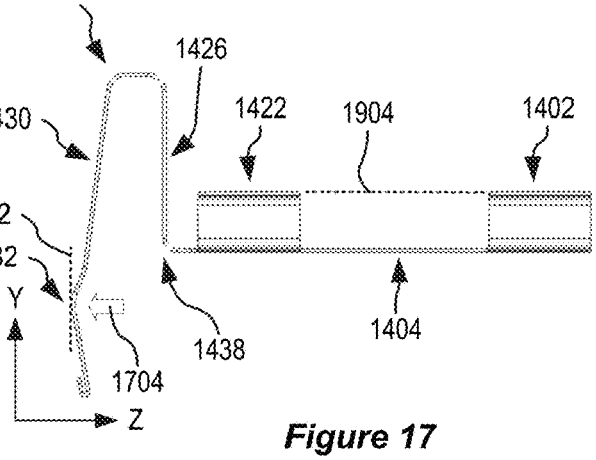
FIG. 17 is a right-side elevation of the first and second spring strips of FIGS. 7, 12, 14, 15 and 16, in an embodiment.
Figure 18:
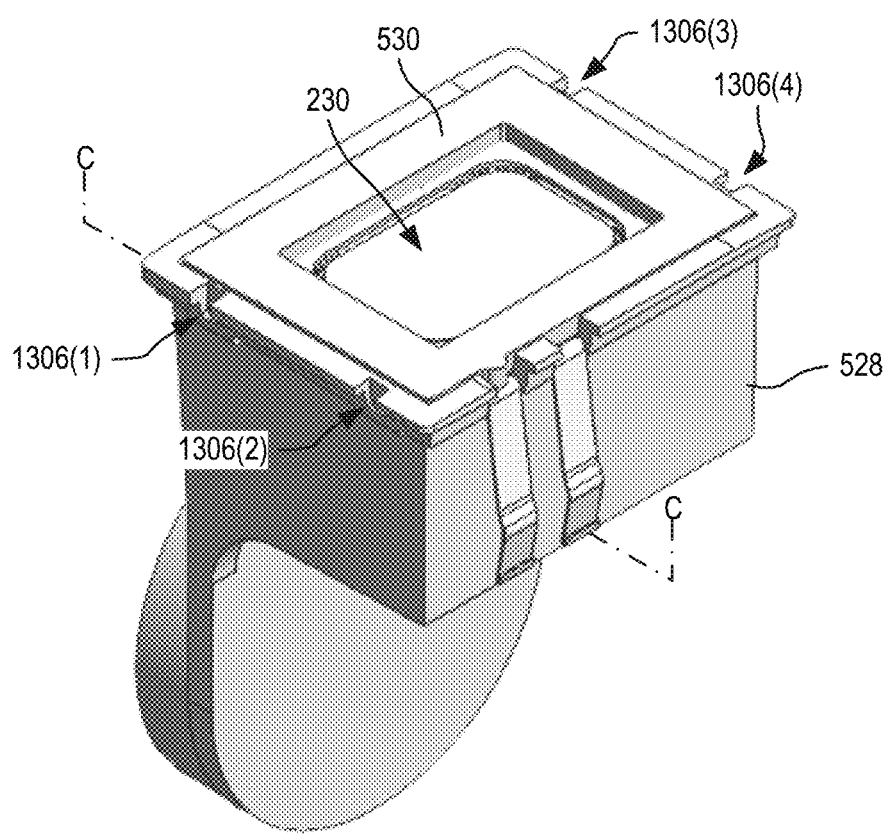
FIG. 18 is a top perspective view of the speaker box and the first and second spring strips, with the speaker and the speaker gasket installed, in an embodiment.

FIG. 12 is a top perspective view showing example internal structure 1202 of the speaker box 528 of FIGS. 5 and 7 (which is an embodiment of the speaker box 128 of FIG. 1) with the first spring strip 716 and the second spring strip 718. FIG. 13 is a top view of the speaker box 528 with the first and second spring strips 716/718 omitted. FIG. 14 is a top perspective view of the first spring strip 716 and the second spring strip 718 of FIGS. 7 and 12. FIG. 15 is a front elevation view of the first spring strip 716 and the second spring strip 718 of FIGS. 7, 12, and 14. FIG. 16 is a top plan view of the first spring strip 716 and the second spring strip 718 of FIGS. 7, 12, 14, and 15. FIG. 17 is a right-side elevation view of the first spring strip 716 and the second spring strip 718 of FIGS. 7, 12, 14, 1415 and 16. FIG. 18 is a top perspective view of the speaker box 528 and the first spring strip 716 and the second spring strip 718, with the speaker 230 and the speaker gasket 530 installed. FIGS. 12 through 18 are best viewed together with the following description.

The speaker box 528 encloses a volume of air (e.g., one cubic centimeter) beneath the bottom side 900 of the speaker 230. The speaker box 528 has five solid sides formed by walls 1204(1)-(5) (e.g., left, right, back, front, and bottom) and an opening 1206 for receiving the speaker 230 and the speaker gasket 530, as shown in FIG. 18. The opening 1206 is formed as a stepped flange 1208 with a lower ledge 1210. The speaker gasket 530 is shaped and sized to fit within the stepped flange 1208 such that a lower surface 1010 (FIG. 11) of the gasket flange 1006 abuts the ledge 1210 and the gasket wall 1002 fits within the walls 1204(1)-(4) of the speaker box 528. The front wall 1204(3) of the speaker box 528 has a first notch 1302 that seats the first spring strip 716 and a second notch 1304 that seats the second spring strip 718. Each of the first notch 1302 and the second notch 1304 has a width corresponding to the width of the first spring strip 716 and the second spring strip 718.

The inner wall 304 of the inner housing 302 includes the stepped aperture 308 (e.g., see FIG. 3) that receives the speaker box 528. The stepped aperture 308 includes a plurality of aperture protrusions 322, positioned around the internal edge of the stepped aperture 308, that mechanically engage (snap together and/or interlock) with corresponding box protrusions 1306 of the speaker box 528 to retain the speaker box 528 within the stepped aperture 308, and thus with the inner housing 302. The box protrusions 1306 are located immediately below the stepped flange 1208 of the speaker box 528.

Figure 19:
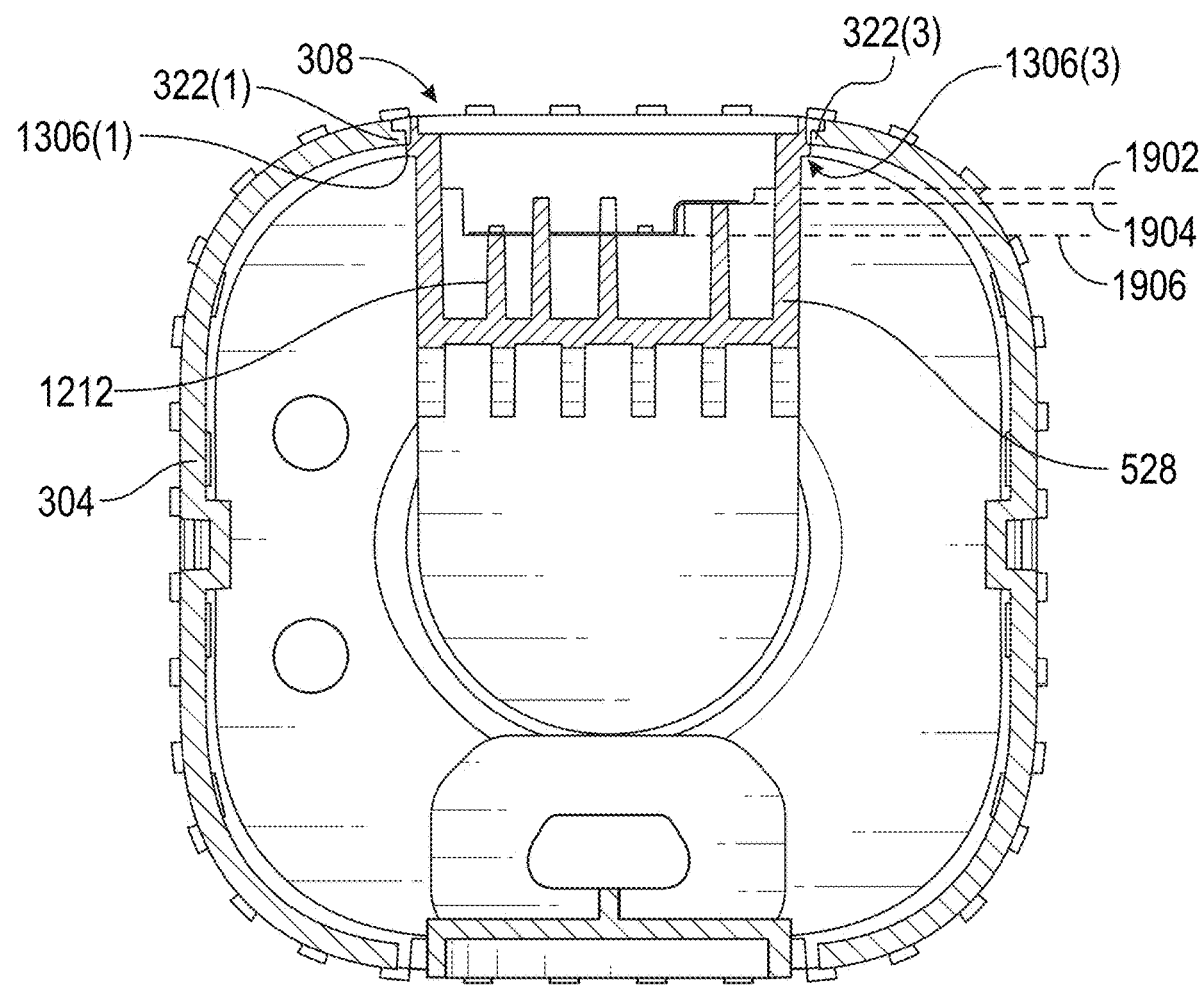
FIG. 19 is a cross-sectional view of the inner housing and the speaker box of FIG. 7 taken through the plane A-A in FIG. 7, in an embodiment.

The internal structure 1202 is formed of at least one internal wall 1212 that divides the internal volume of the speaker box 528 into a plurality of open cells. The at least one internal wall 1212 may adjoin one or more of the walls 1204(1)-(5) of the speaker box 528. Different portions of the internal wall 1212 have different heights and form a first plane 1902, a second plane 1904, and a third plane 1906 (which are best seen in FIG. 19) that are parallel to the ledge 1210. The speaker 230 is supported by a first surface 1214 of the internal wall 1212 at the first plane 1902. A third surface 1218 of the internal wall 1212 at the third plane 1906 may form a plurality of posts 1308 for securing the first and second spring strips 716/718 with the speaker box 528. For example, after placement of the first spring strip 716 and the second spring strip 718 on their respective posts 1308, the posts 1308 may be deformed (e.g., via ultrasonic welding) to secure the first spring strip 716 and the second spring strip 718 in place. A second surface 1216 of the internal wall 1212 at the second plane 1904 supports first speaker contact area 1402 and second speaker contact areas 1422. The first spring strip 716 forms a plurality of openings 1602(1)-(3) that align with the posts 1308(1)-(3), respectively, and the second spring strip 718 forms a plurality of openings 1602(4)-(5) that align with the posts 1308(4)-(5), respectively. The internal wall 1212 and the first and second spring strips 716/718 may have fewer or more posts 1308 and/or openings 1602 without departing from the scope of the embodiments herein.

The first spring strip 716 is formed from a flat, thin "L" shaped (when viewed from the top as shown in FIG. 16) metal strip that includes a plurality of bends 1414, 1416, 1418, and 1420. First and second right-angle bends 1414 and 1416 form the first speaker contact area 1402 at the second plane 1904 and a first offset region 1404 at the third plane 1906. A third right-angle bend 1418, at an opposite end of the first offset region 1404 from the first speaker contact area 1402, forms a first leg 1406 of a first U-shaped region 1408 (when viewed from the side as shown in FIG. 17) formed by a rounded bend 1420 and a second leg 1410. A first PCB contact 1412 is formed near an end of the second leg 1410. The second spring strip 718 is formed from a flat, thin "L" shaped metal strip that includes a plurality of bends 1434, 1436, 1438, and 1440. First and second right-angle bends 1434 and 1436 form the second speaker contact area 1422 on the second plane 1904 and a second offset region 1424 at the third plane 1906. A third right-angle bend 1438, at an opposite end of the second offset region 1424 from the second speaker contact area 1422, forms a first leg 1426 of a second U-shaped region 1428 formed by a rounded bend 1440 and a second leg 1430. A second PCB contact 1432 is formed near an end of the second leg 1430.

With reference to FIG. 12, each of the first U-shaped region 1408 and the second U-shaped region 1428 wraps around an edge of the front wall 1204(3) of the speaker box 528, such that each of the first legs 1406 and 1426 of the first U-shaped region 1408 and the second U-shaped region 1428 extends along, and may extend along, an inner surface 1310 of the front wall 1204(3). The second legs 1410 and 1430 of each of the first U-shaped region 1408 and the second U-shaped region 1428 are positioned outside the front wall 1204(3), and the top edge of the front wall 1204(3), within each corresponding first notch 1302 and the second notch 1304, seats at a base of each corresponding one of the first U-shaped region 1408 and the second U-shaped region 1428. The inner surface 1310 of the front wall 1204(3) may include a first recess 1312, aligned with the first notch 1302, for receiving the first leg 1406 of the U-shaped region 1408 of the spring strip 716. The inner surface 1310 of the front wall 1204(3) may include a second recess 1314, aligned with the second notch 1304, for receiving the first leg 1426 of the U-shaped region 1428 of the second spring strip 718.

Accordingly, the first spring strip 716 has the first U-shaped region 1408 adjacent the first PCB contact 1412, and the first speaker contact area 1402 adjacent to the first offset region 1404. Similarly, the second spring strip 718 has the second U-shaped region 1428 adjacent the second PCB contact 1432, and the second speaker contact area 1422 adjacent to the second offset region 1424. The first speaker contact area 1402 and the second speaker contact area 1422 are positioned within the cavity formed by the speaker box 528, and are on the second plane 1904 (e.g., parallel to the indicated X-Z plane). The first PCB contact 1412 and the second PCB contact 1432 are outside of the speaker box 528 and at a plane 1702 (e.g., parallel to the indicated X-Y plane) that is orthogonal to the second plane 1904 of the first speaker contact area 1402 and the second speaker contact area 1422.

The speaker 230 is supported within the speaker box 528 by the internal wall 1212 at the first plane 1902, and the speaker contacts 920/922 are spring contacts that extend to at least the second plane 1904 to connect with the first speaker contact area 1402 and the second speaker contact area 1422, respectively. The offset regions 1404 and 1424 are positioned on the third plane 1906 and may thereby transition beneath the speaker 230 without contacting the bottom surface 902 of the speaker 230. Advantageously, the first spring strip 716 and the second spring strip 718 provide electrical connectivity between the plane 1702 and the second plane 1904 without being shorted together by the bottom surface 902 of the speaker 230, and pass between the front wall 1204(3) and the speaker gasket 530 without adversely affecting the seal formed by the speaker gasket 530, the speaker 230, and the speaker box 528.

The first PCB contact 1412 and the second PCB contact 1432 each apply a spring return force, indicated by arrow 1704, in a direction normal to the plane 1702 (e.g., the X-Y plane), away from the speaker box 528, and onto the first contact pad 624 and the second contact pad 626, respectively. Advantageously, this spring return force 1704 maintains electrical contact between each of the first PCB contact 1412 and the second PCB contact 1432 and the first contact pad 624 and the second contact pad 626, respectively, on the PCB 512 without structurally distorting the outer wall 208 of the electronic device 200 when assembled. For example, the spring return force 1704 exerted by each of the first PCB contact 1412 and the second PCB contact 1432 may be in the range of 0.01 lbf to 0.45 lbf, and the first PCB contact 1412 and the second PCB contact 1432 may each have a deflection range of between 0.25 mm and 1.15 mm, such as between 0.45 mm and 0.95 mm.

As discussed above, the first spring strip 716 and the second spring strip 718 preferably comprise materials that are flexible and resilient in addition to being electrically conductive. The resiliency of the first and second spring strips 716/718 enables them to exert the spring return force 1704 on the first and second contact pads 624/626, respectively, when the second legs 1410/1430 of the U-shaped regions 1408/1428 are deflected inwardly as the inner housing 302 and the outer housing 210 are mated together. Preferably, the material of the spring strips 716/718 has an elastic modulus in the range from 128 GPa (gigapascals) to 193 GPa. As discussed above, the spring strips 716/718 may comprise a full hard-temper type-301 stainless steel with a thickness in the range of between 0.3 mm and 0.05 mm (e.g., a thickness of one-tenth of one millimeter (0.1 mm) for the full hard-temper type-301 stainless steel) with an elastic modulus of 193 GPa, and may be zinc-plated to improve electrical conductivity.

FIG. 19 is a cross-sectional view of the inner housing 302 and the speaker box 528 of FIG. 7 taken through the plane A-A in FIG. 7, illustrating engagement between the box protrusions 1306 and the aperture protrusions 322 when the speaker box 528 is completely inserted into the stepped aperture 308 of the inner wall 304. The speaker box 528 is inserted into the stepped aperture 308 and pressed down until the box protrusions 1306 engage (e.g., interlock) with the aperture protrusions 322 of the inner wall 304. FIG. 19 also shows the first, second, and third planes 1902, 1904, and 1906 formed by the internal wall 1212 of the speaker box 528.

Figure 20:
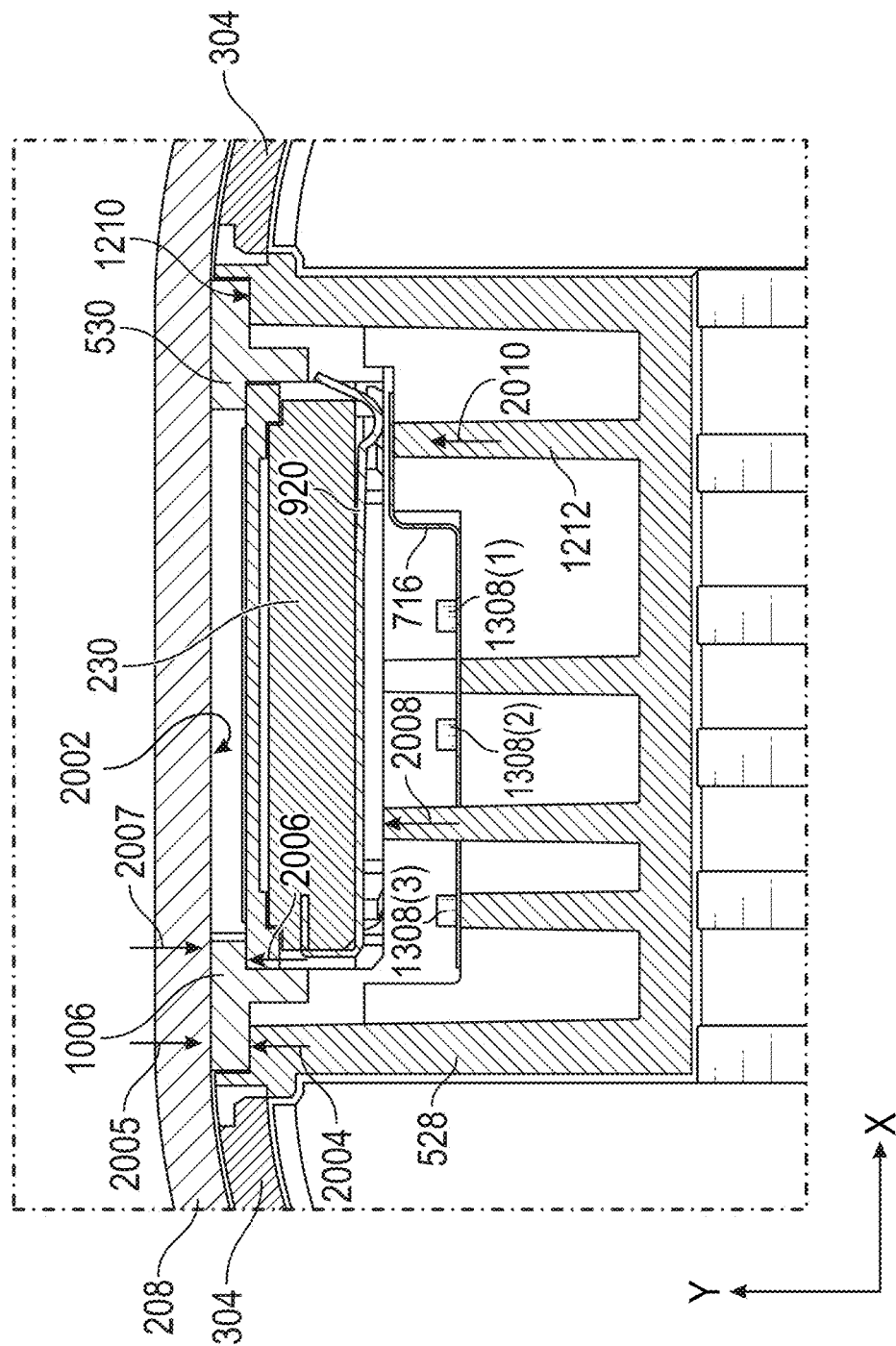
FIG. 20 is a portion of a cross-sectional view of the electronic device of FIGS. 1 and 2 taken through the plane B-B in FIG. 2, in an embodiment.

FIG. 20 is a cross-sectional view of the electronic device of FIGS. 1 and 2 taken through the plane B-B in FIG. 2, illustrating compression of the speaker gasket 530 between (a) the outer wall 208 of the outer housing 210 and the speaker box 528, and (b) the outer wall 208 of the outer housing 210 and the speaker 230. The inner wall 304 of the inner housing 302 supports the speaker box 528, which in turn supports, as indicated by force arrow 2008, the speaker 230 via the internal wall 1212. The gasket flange 1006 of the speaker gasket 530 is thicker than the gap between the outer wall 208 and the ledge 1210 of the speaker box 528 such that when assembled the gasket flange 1006 is compressed by forces 2004 and 2005 and by forces 2006 and 2007. The internal wall 1212 of the speaker box 528 also exerts a counter-force 2010 to the first spring strip 716 against a force from the first speaker contact 920. A similar counter-force (not shown) is exerted to the second spring strip 718 against a force from the second speaker contact 922.

Figure 21:
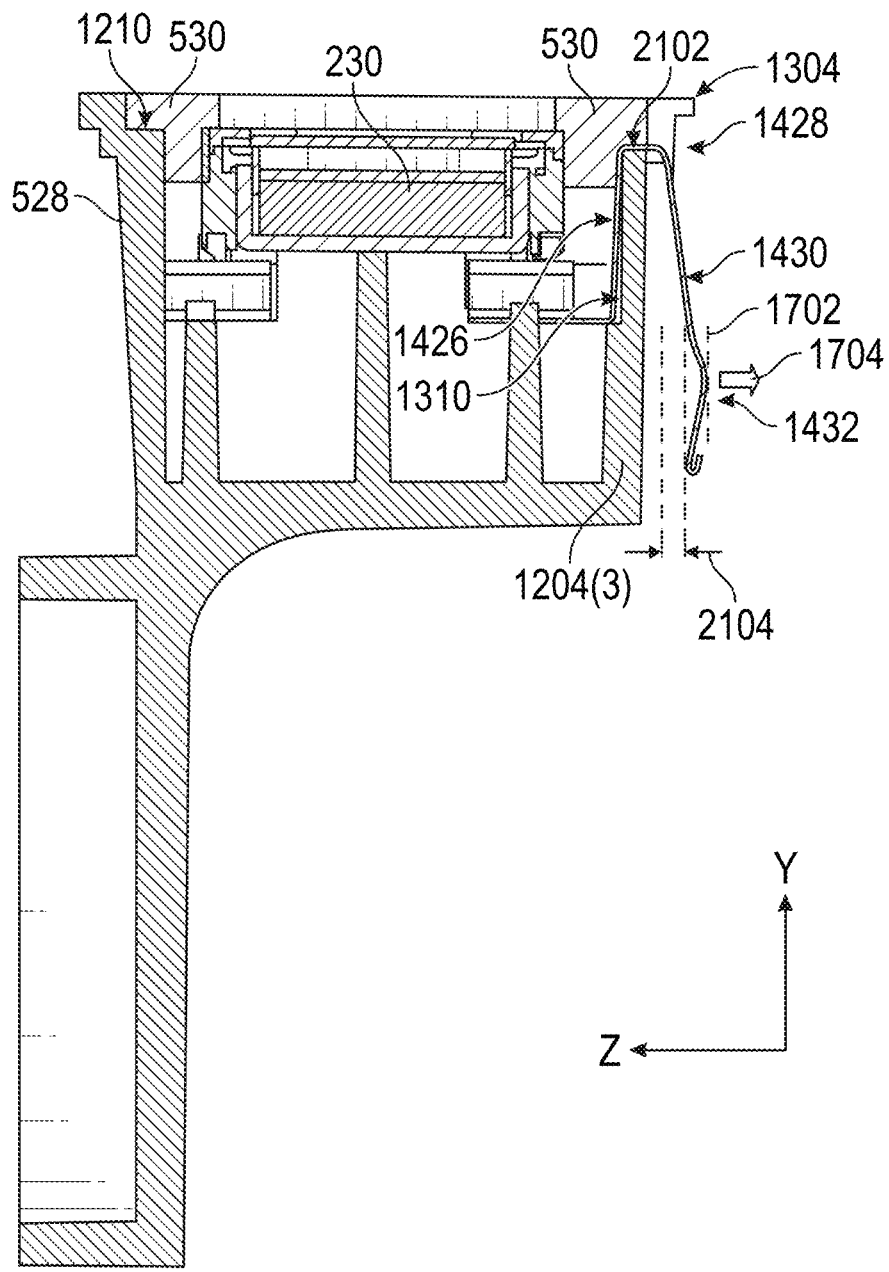
FIG. 21 is a cross-sectional view of the speaker box of FIG. 18 taken through the plane C-C in FIG. 18, in an embodiment.

FIG. 21 is a cross-sectional view of the speaker box 528 of FIG. 18 taken through the plane C-C in FIG. 18, illustrating the U-shaped region 1428 of the second spring strip 718 wrapping around an edge 2102 of the front wall 1204(3) of the speaker box 528. The first leg 1426 of the U-shaped region 1428 extends along, and may abut, an inner surface 1310 of the front wall 1204(3), the second leg 1430 of the U-shaped region 1428 is positioned outside the front wall 1204(3), and the edge 2102 of the front wall 1204(3) seats within a base of the U-shaped region 1428. The edge 2102, within each of the first notch 1302 and the second notch 1304, may be recessed below the height of the ledge 1210 by about a thickness (e.g., 0.1 mm) of the first spring strip 716 and the second spring strip 718. Although not shown in FIG. 21, the U-shaped region 1408 of the first spring strip 716 wraps around an edge of the front wall 1204(3) within the first notch 1302 of the speaker box 528 in a manner similar to that shown for the second spring strip 718 within the second notch 1304.

The second leg 1430 is shown without deflection. However, when the inner housing 302 and the outer housing 210 are mated together, the second legs 1410/1430 of the first and second spring strips 716/718, respectively, deflect inward as the first and second PCB contacts 1412/1432 engage the first and second contact pads 624/626, respectively, of the PCB 512. In various embodiments, the second legs 1410/1430 may have an operational deflection range 2104 of between 0.25 mm and 1.15 mm, such as between 0.45 mm and 0.95 mm, which results in a spring return force in the range of 0.01 lbf to 0.45 lbf bearing against the first and second contact pads 624/626 on the PCB 512. The U-shaped regions 1408/1428 preferably undergo no plastic deformation when the second legs 1410/1430 deflect within the operational range 2104.

Figure 22:
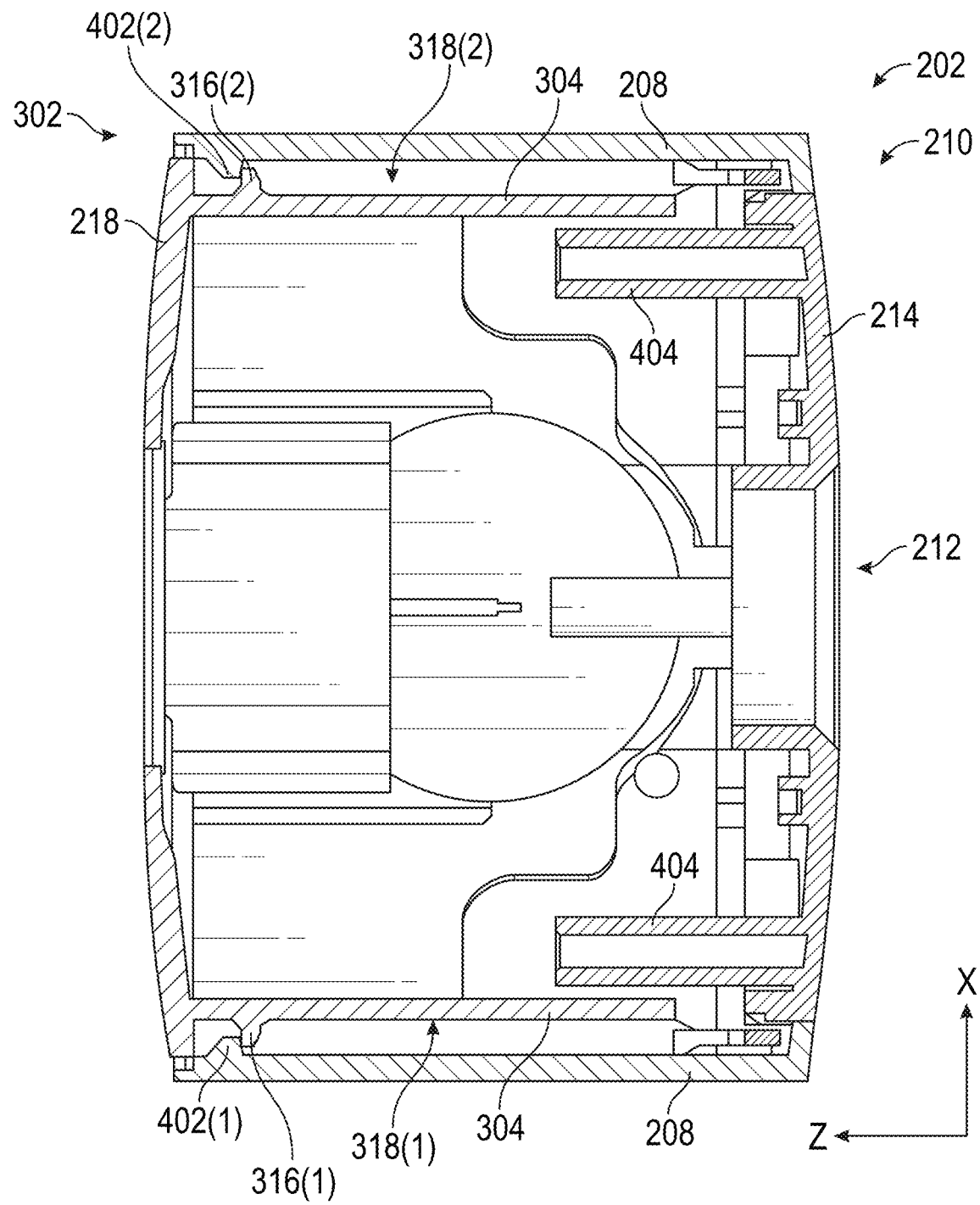
FIG. 22 is a cross-sectional view of the enclosure of the electronic device of FIGS. 1 and 2 taken through the plane D-D in FIG. 2, in an embodiment.

FIG. 22 is a cross-sectional view of the enclosure 202 of the electronic device 200 of FIG. 2 taken through the plane D-D in FIG. 2. The internal components 500 of the electronic device 200 are omitted for clarity of illustration. The enclosure 202 is assembled by aligning the inner housing 302 with the outer housing 210 such that the outer-housing protrusions 402 of the outer housing 210 slide into the channels 318 of the inner housing 302. The inner housing 302 is pressed into the outer housing 210 until the outer-housing protrusions 402 snap past the corresponding inner-housing protrusions 316 and the inner housing 302 is retained within the outer housing 210.

Figure 23:
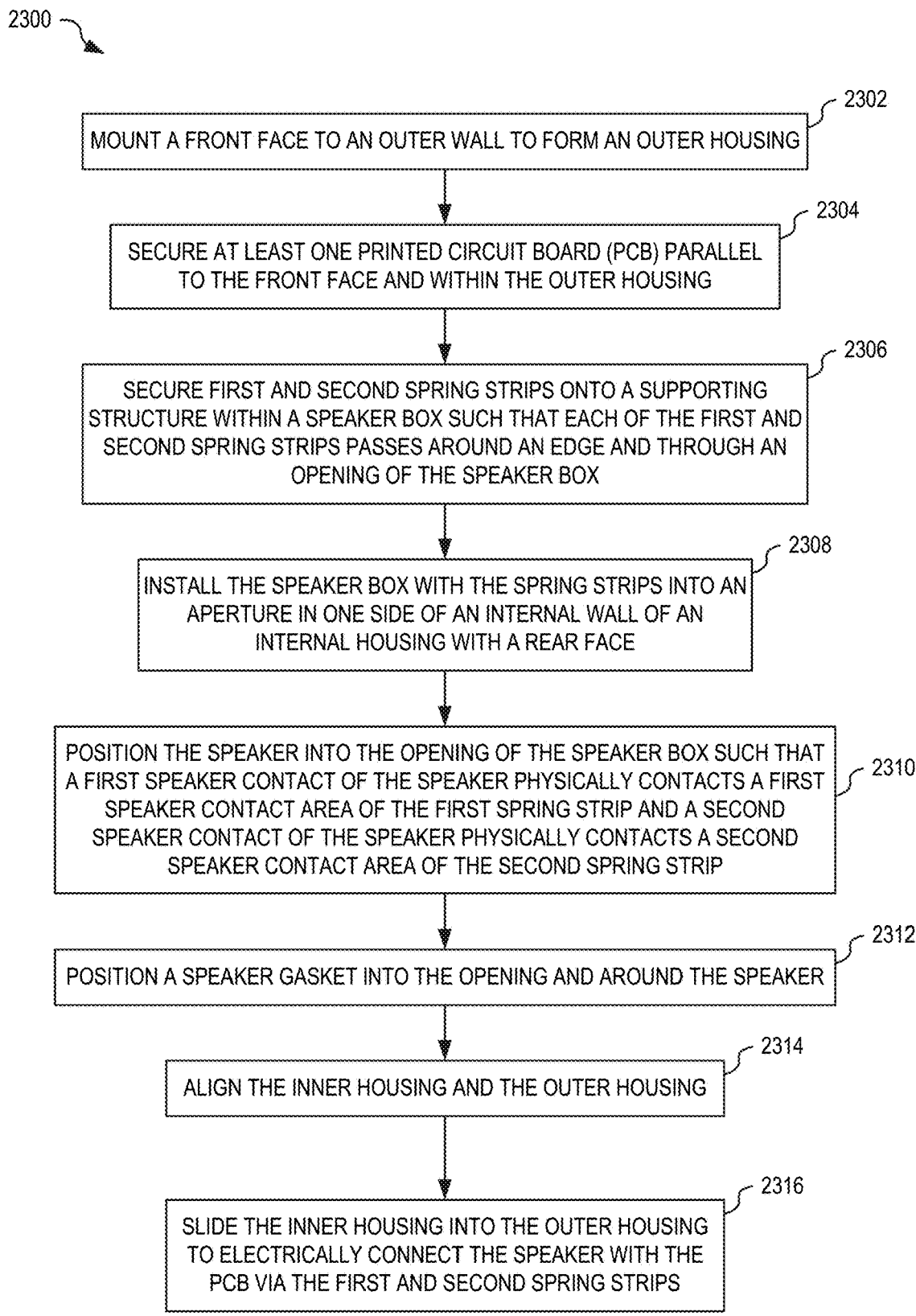
FIG. 23 is a flowchart illustrating one example method for assembling the electronic device of FIGS. 1 and 2 without the use of wires between the speaker and the PCB.

FIG. 23 is a flowchart illustrating one example method 2300 for assembling the electronic device 200 of FIG. 2 (which is an embodiment of the electronic device 100 of FIG. 1) without the use of wires between the speaker 230 and the PCB 512 according to the present embodiments. The electronic device 200 is formed of two main parts that are joined together to form the electronic device 200. The inner housing 302 includes the speaker box 528 and the speaker 230 and the outer housing 210 includes the PCB 512 and circuitry for driving the speaker 230. Accordingly, the speaker 230 requires electrical connections with the PCB 512. The following assembly method 2300 using the first and second spring strips 716/718, described above, provides a simple error reduced assembly sequence that reduces assembly time and cost. In embodiments, the aspects of method 2300 also apply to the electronic device 100, such as use of the spring strips 116/118, even if the housing of the electronic device 100 is not shown as expressly having two parts.

In block 2302, the method 2300 comprises mounting a front face to an outer wall to form an outer housing. In one example of block 2302, the front face 214 is mounted to the outer wall 208.

In block 2304, the method 2300 comprises securing at least one PCB parallel to the front face and within the outer housing. In one example of block 2304, the PCBs 512(1) and 512(2) are secured to the pillars 404 of the outer housing 210.

In block 2306, the method 2300 comprises securing first and second spring strips onto a supporting structure within a speaker box such that each of the first and second spring strips passes around an edge and through an opening of the speaker box. In one example of block 2306, the first spring strip 716 and the second spring strip 718 are secured to the posts 1308 of the speaker box 528 such that the first spring strip 716 passes through the first notch 1302 and the second spring strip 718 passes through the second notch 1304. In certain embodiments of block 2306, the posts 1308 are deformed (e.g., via ultrasonic welding) after the first spring strip 716 and the second spring strip 718 are placed thereon to secure the first spring strip 716 and the second spring strip 718 in place.

In block 2308, the method 2300 comprises installing the speaker box with the spring strips into an aperture in one side of an internal wall of an internal housing with a rear face. In one example of block 2308, the speaker box 528 with the first spring strip 716 and the second spring strip 718 is inserted into the stepped aperture 308 and pressed down until the aperture protrusions 322 and the box protrusions 1306 engage (e.g., interlock).

In block 2310, the method 2300 comprises positioning the speaker into the opening of the speaker box such that a first speaker contact of the speaker physically contacts a first speaker contact area of the first spring strip and a second speaker contact of the speaker physically contacts a second speaker contact area of the second spring strip. In one example of block 2310, the speaker 230 is positioned into the opening 1206 of the speaker box 528 and oriented such that the first speaker contact 920 and the second speaker contact 922 connect with the first speaker contact area 1402 and the second speaker contact area 1422, respectively.

In block 2312, the method 2300 comprises positioning a speaker gasket into the opening and around the speaker. In one example of block 2312, the speaker gasket 530 is positioned within the opening 1206 of the speaker box 528 to surround the speaker 230.

In block 2314, the method 2300 comprises aligning the inner housing and the outer housing. In one example of block 2314, the inner housing 302 is aligned with the outer housing 210.

In block 2316, the method 2300 comprises sliding the inner housing into the outer housing to electrically connect the speaker with the PCB via the first and second spring strips. In one example of block 2316, the inner housing 302 is pressed into the outer housing 210 until the inner-housing protrusions 316 and outer-housing protrusions 402 engage (e.g., interlock) to retain the inner housing 302 within the outer housing 210, whereby the first PCB contact 1412 and the second PCB contact 1432 bear against the first contact pad 624 and the second contact pad 626, respectively, of the at least one PCB 512 such that the speaker 230 is electrically connected to the at least one PCB 512 via the first spring strip 716 and the second spring strip 718. The outer wall 208 compresses the speaker gasket 530 against the speaker box 528 to form a seal between the speaker 230 and the speaker box 528.

In a first aspect, a camera apparatus includes: an outer housing having an outer wall extending at least partially around a front face of the camera apparatus, the outer wall forming speaker holes at one side; an inner housing having an internal wall extending at least partially around a rear face of the camera apparatus and forming a stepped aperture in one side of the internal wall and at least two protrusions proximate the stepped aperture; a speaker having a first speaker contact and a second speaker contact; a speaker box positioned within the inner housing and coupled with the speaker to enhance sound output from the speaker, and having at least two first protrusions that mechanically engage the at least two second protrusions of the inner housing to retain the speaker box within the stepped aperture; at least one printed circuit board (PCB) positioned within the outer housing and secured to pillars of the front face such that the at least one PCB is parallel to the front face, the at least one PCB having a first contact pad and a second contact pad electrically coupled to speaker drive circuitry on the at least one PCB; a camera located on the at least one PCB with a field of view through a camera aperture in the front face; a microphone electrically coupled with the PCB and positioned, within the outer housing, adjacent a microphone aperture in the front face; a speaker gasket extending around the speaker and forming a seal between the speaker and the speaker box; a first spring strip having a flat, thin cross-section extending between the speaker gasket and the speaker box without adversely affecting the seal, the first spring strip being physically shaped to electrically connect the first contact pad to the first speaker contact; and a second spring strip having a flat, thin cross-section extending between the speaker gasket and the speaker box without adversely affecting the seal, the second spring strip being physically shaped to electrically connect the second contact pad to the second speaker contact.

In a second aspect, an electronic device includes: a speaker having a first speaker contact and a second speaker contact; a speaker box coupled with the speaker; a printed circuit board (PCB) having a first contact pad and a second contact pad; a speaker gasket disposed between the speaker and the speaker box; a first spring strip electrically connecting the first contact pad to the first speaker contact, the first spring strip having a flat, thin cross-section in at least a first portion of the first spring strip extending between the speaker gasket and the speaker box; and a second spring strip electrically connecting the second contact pad to the second speaker contact, the second spring strip having a flat, thin cross-section in at least a second portion of the second spring strip extending between the speaker gasket and the speaker box.

In certain embodiments of the second aspect, each of the first and second spring strips has a thickness of between 0.3 mm and 0.05 mm in the first and second portions, respectively.

In certain embodiments of the second aspect, the first spring strip has: a first speaker contact area located within the speaker box and electrically coupling with the first speaker contact; and a first PCB contact located external to the speaker box and electrically coupling with the first contact pad; and the second spring strip has: a second speaker contact area located within the speaker box and electrically coupling with the second speaker contact; and a second PCB contact located external to the speaker box and electrically coupling with the second contact pad.

In certain embodiments of the second aspect, the first spring strip has a first offset region adjoining the first speaker contact area, the second spring strip has a second offset region adjoining the second speaker contact area, the first and second offset regions being spaced from an electrically conductive bottom surface of the speaker.

In certain embodiments of the second aspect, the speaker box has an internal structure of open cells formed by at least one internal wall extending from a base of the speaker box and forming (a) a first plane supporting the first offset region and the second offset region, (b) a second plane supporting the first speaker contact area and the second speaker contact area, and (c) a third plane that abuts a back side of the speaker and positions the speaker within an open top formed by the speaker box.

In certain embodiments of the second aspect, the internal structure exerts a first counter-force against the first speaker contact and a second counter-force against the second speaker contact.

In certain embodiments of the second aspect, the first offset region forms at least one first opening to receive at least one first post extending from the speaker box, and the second offset region forms at least one second opening to receive at least one second post extending from the speaker box.

In certain embodiments of the second aspect, the first spring strip is secured to the speaker box by the at least one first post and the second spring strip is secured to the speaker box by the at least one second post.

In certain embodiments of the second aspect, the first and second speaker contact areas lay in a first plane, and the first and second PCB contacts lay in a second plane perpendicular to the first plane.

In certain embodiments of the second aspect, the first spring strip has a first U-shaped region adjacent the first PCB contact, and the second spring strip has a second U-shaped region adjacent the second PCB contact.

In certain embodiments of the second aspect, each of the first and second U-shaped regions wraps around an edge of a wall of the speaker box, wherein a first leg of each of the first and second U-shaped regions extends along an inner surface of the wall, a second leg of each of the first and second U-shaped regions is positioned outside the wall, and the edge of the wall seats within a base of each of the first and second U-shaped regions.

In certain embodiments of the second aspect, the first and second PCB contacts each apply a spring return force in a direction normal to the PCB to maintain electrical contact between each of the first and second spring strips and the corresponding one of the first and second contact pads without structurally distorting an outer housing of the electronic device.

In certain embodiments of the second aspect, the spring return force is between 0.01 lbf and 0.45 lbf.

In certain embodiments of the second aspect, each of the first and second spring strips having an elastic modulus in the range from 128 GPa (gigapascals) to 193 GPa.

Certain embodiments of the second aspect, further include: an inner housing having an internal wall extending at least partially around a rear face of the electronic device and forming a stepped aperture in one side of the internal wall and at least two protrusions that mechanically engage at least two corresponding protrusions of the speaker box; an outer housing having an outer wall extending at least partially around a front face of the electronic device, the outer wall forming speaker holes at one side, the front face mechanically coupling with the PCB such that the PCB is parallel to the front face; and wherein the inner housing, when inserted within the outer housing, forms an enclosure of the electronic device and electrically couples the speaker to the PCB via the first and second spring strips.

In certain embodiments of the second aspect, the speaker gasket has a gasket wall surrounding side edges of the speaker and a flange forming an aperture smaller than the speaker, the flange being positioned between the speaker and an internal surface of the outer wall.

In certain embodiments of the second aspect, the internal surface of the outer wall bears against, and compresses, the speaker gasket.

In certain embodiments of the second aspect, the inner housing forms at least two first protrusions that mechanically engage at least two second protrusions formed by the outer housing.

In a third aspect, an electronic device includes at least one processor, a memory communicatively coupled with the at least one processor, a camera communicatively coupled with the at least one processor, a microphone communicatively coupled with the at least one processor, a speaker having a first speaker contact and a second speaker contact, a printed circuit board (PCB) having a first contact pad and a second contact pad, a first spring strip electrically connecting the first contact pad to the first speaker contact, and a second spring strip electrically connecting the second contact pad to the second speaker contact.

Certain embodiments of the third aspect, further include a speaker box coupled with the speaker.

Certain embodiments of the third aspect, further include a speaker gasket disposed between the speaker and the speaker box.

In certain embodiments of the third aspect, the first and second spring strips each have a flat, thin cross-section in at least portions of the first and second spring strips that extend between the speaker gasket and the speaker box.

In a fourth aspect, a method manufactures an electronic device with a speaker. The method includes: mounting a front face to an outer wall to form an outer housing; securing at least one printed circuit board (PCB) parallel to the front face and within the outer housing, the PCB including a first contact pad and a second contact pad; securing first and second spring strips with respect to a supporting structure within a speaker box such that each of the first and second spring strips passes through a different one of two notches in an open top of the speaker box; installing the speaker box into a stepped aperture in one side of an internal wall of an inner housing with a rear face; positioning the speaker into the open top such that a first speaker contact of the speaker physically contacts a first speaker contact area of the first spring strip and a second speaker contact of the speaker physically contacts a second speaker contact area of the second spring strip; positioning a speaker gasket into the open top and around the speaker; aligning the inner housing and the outer housing; and sliding the inner housing into the outer housing such that a first PCB contact of the first spring strip bears against the first contact pad of the PCB and a second PCB contact of the second spring strip bears against the second contact pad of the PCB to electrically connect the speaker with the PCB via the first and second spring strips. The outer wall compresses the speaker gasket against the speaker box to form a seal between the speaker and the speaker box.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A camera apparatus, comprising:
an outer housing having an outer wall extending at least partially around a front face of the camera apparatus, the outer wall forming speaker holes at one side;
an inner housing having an internal wall extending at least partially around a rear face of the camera apparatus and forming a stepped aperture in one side of the internal wall and at least two protrusions proximate the stepped aperture;
a speaker having a first speaker contact and a second speaker contact;
a speaker box positioned within the inner housing and coupled with the speaker to enhance sound output from the speaker, and having at least two first protrusions that mechanically engage the at least two protrusions of the inner housing to retain the speaker box within the stepped aperture;
at least one printed circuit board (PCB) positioned within the outer housing and secured to pillars of the front face such that the at least one PCB is parallel to the front face, the at least one PCB having a first contact pad and a second contact pad electrically coupled to speaker drive circuitry on the at least one PCB;
a camera located on the at least one PCB with a field of view through a camera aperture in the front face;
a microphone electrically coupled with the PCB and positioned, within the outer housing, adjacent a microphone aperture in the front face;
a speaker gasket extending around the speaker and forming a seal between the speaker and the speaker box;
a first spring strip having a flat, thin cross-section extending between the speaker gasket and the speaker box without adversely affecting the seal, the first spring strip being physically shaped to electrically connect the first contact pad to the first speaker contact; and
a second spring strip having a flat, thin cross-section extending between the speaker gasket and the speaker box without adversely affecting the seal, the second spring strip being physically shaped to electrically connect the second contact pad to the second speaker contact.

2. An electronic device, comprising:
a speaker having a first speaker contact and a second speaker contact;
a speaker box coupled with the speaker;
a printed circuit board (PCB) having a first contact pad and a second contact pad;
a speaker gasket disposed between the speaker and the speaker box;
a first spring strip electrically connecting the first contact pad to the first speaker contact, the first spring strip having a flat, thin cross-section in at least a first portion of the first spring strip extending between the speaker gasket and the speaker box; and
a second spring strip electrically connecting the second contact pad to the second speaker contact, the second spring strip having a flat, thin cross-section in at least a second portion of the second spring strip extending between the speaker gasket and the speaker box;
wherein each of the first and second spring strips have an elastic modulus in the range from 128 gigapascals (GPa) to 193 gigapascals.

3. The electronic device of claim 2, each of the first and second spring strips having a thickness of between 0.3 mm and 0.05 mm in the first and second portions, respectively.

4. The electronic device of claim 2,
the first spring strip having:
a first speaker contact area located within the speaker box and electrically coupling with the first speaker contact; and
a first PCB contact located external to the speaker box and electrically coupling with the first contact pad; and
the second spring strip having:
a second speaker contact area located within the speaker box and electrically coupling with the second speaker contact; and
a second PCB contact located external to the speaker box and electrically coupling with the second contact pad.

5. The electronic device of claim 4, the first spring strip having a first offset region adjoining the first speaker contact area, the second spring strip having a second offset region adjoining the second speaker contact area, the first and second offset regions being spaced from an electrically conductive bottom surface of the speaker.

6. The electronic device of claim 5, the speaker box having an internal structure of open cells formed by at least one internal wall extending from a base of the speaker box and forming (a) a first plane supporting the first offset region and the second offset region, (b) a second plane supporting the first speaker contact area and the second speaker contact area, and (c) a third plane that abuts a back side of the speaker and positions the speaker within an open top formed by the speaker box.

7. The electronic device of claim 5, the first offset region forming at least one first opening to receive at least one first post extending from the speaker box, and the second offset region forming at least one second opening to receive at least one second post extending from the speaker box.

8. The electronic device of claim 4, the first spring strip having a first U-shaped region adjacent the first PCB contact, and the second spring strip having a second U-shaped region adjacent the second PCB contact.

9. The electronic device of claim 8, each of the first and second U-shaped regions wrapping around an edge of a wall of the speaker box, wherein a first leg of each of the first and second U-shaped regions extends along an inner surface of the wall, a second leg of each of the first and second U-shaped regions is positioned outside the wall, and the edge of the wall seats within a base of each of the first and second U-shaped regions.

10. The electronic device of claim 9, each of the first and second spring strips having a thickness of between 0.3 mm and 0.05 mm in the first and second portions, respectively.

11. The electronic device of claim 4, the first and second PCB contacts each applying a spring return force in a direction normal to the PCB to maintain electrical contact between each of the first and second spring strips and the corresponding one of the first and second contact pads without structurally distorting an outer housing of the electronic device.

12. An electronic device, comprising:
a speaker having a first speaker contact and a second speaker contact;
a speaker box coupled with the speaker;
a printed circuit board (PCB) having a first contact pad and a second contact pad;
a speaker gasket disposed between the speaker and the speaker box;
a first spring strip electrically connecting the first contact pad to the first speaker contact, the first spring strip having a flat, thin cross-section in at least a first portion of the first spring strip extending between the speaker gasket and the speaker box; and
a second spring strip electrically connecting the second contact pad to the second speaker contact, the second spring strip having a flat, thin cross-section in at least a second portion of the second spring strip extending between the speaker gasket and the speaker box;
wherein the first spring strip has:
a first speaker contact area located within the speaker box and electrically coupling with the first speaker contact, and
a first PCB contact located external to the speaker box and electrically coupling with the first contact pad; and
wherein the second spring strip has:
a second speaker contact area located within the speaker box and electrically coupling with the second speaker contact, and
a second PCB contact located external to the speaker box and electrically coupling with the second contact pad; and
wherein the first and second speaker contact areas lie in a first plane, and the first and second PCB contacts lie in a second plane perpendicular to the first plane.

13. The electronic device of claim 12, the first spring strip having a first offset region adjoining the first speaker contact area, the second spring strip having a second offset region adjoining the second speaker contact area, the first and second offset regions being spaced from an electrically conductive bottom surface of the speaker.

14. The electronic device of claim 13, the first offset region forming at least one first opening to receive at least one first post extending from the speaker box, and the second offset region forming at least one second opening to receive at least one second post extending from the speaker box.

15. An electronic device, comprising:
a speaker having a first speaker contact and a second speaker contact;
a speaker box coupled with the speaker;
a printed circuit board (PCB) having a first contact pad and a second contact pad;
a speaker gasket disposed between the speaker and the speaker box;
a first spring strip electrically connecting the first contact pad to the first speaker contact, the first spring strip having a flat, thin cross-section in at least a first portion of the first spring strip extending between the speaker gasket and the speaker box; and
a second spring strip electrically connecting the second contact pad to the second speaker contact, the second spring strip having a flat, thin cross-section in at least a second portion of the second spring strip extending between the speaker gasket and the speaker box,
wherein the first spring strip and the second spring strip each apply a spring return force in a direction normal to the PCB to maintain electrical contact between each of the first and second spring strips and the corresponding one of the first and second contact pads without structurally distorting an outer housing of the electronic device,
wherein the spring return force is between 0.01 pounds of force (lbf) and 0.45 lbf.

16. An electronic device, comprising:
a speaker having a first speaker contact and a second speaker contact;
a speaker box coupled with the speaker;
a printed circuit board (PCB) having a first contact pad and a second contact pad;
a speaker gasket disposed between the speaker and the speaker box;
a first spring strip electrically connecting the first contact pad to the first speaker contact, the first spring strip having a flat, thin cross-section in at least a first portion of the first spring strip extending between the speaker gasket and the speaker box; and
a second spring strip electrically connecting the second contact pad to the second speaker contact, the second spring strip having a flat, thin cross-section in at least a second portion of the second spring strip extending between the speaker gasket and the speaker box;

an inner housing having an internal wall extending at least partially around a rear face of the electronic device and forming a stepped aperture in one side of the internal wall and at least two protrusions that mechanically engage at least two corresponding protrusions of the speaker box; and an outer housing having an outer wall extending at least partially around a front face of the electronic device, the outer wall forming speaker holes at one side, the front face mechanically coupling with the PCB such that the PCB is parallel to the front face;

wherein the inner housing, when inserted within the outer housing, forms an enclosure of the electronic device and electrically couples the speaker to the PCB via the first and second spring strips.

17. The electronic device of claim 16, the speaker gasket having a gasket wall surrounding side edges of the speaker, and a flange forming an aperture smaller than the speaker, the flange being positioned between the speaker and an internal surface of the outer wall.

18. The electronic device of claim 16, the inner housing forming at least two first protrusions that mechanically engage at least two second protrusions formed by the outer housing.

* * * * *